(12) United States Patent
Morioka et al.

(10) Patent No.: US 7,583,644 B2
(45) Date of Patent: Sep. 1, 2009

(54) WIRELESS COMMUNICATION APPARATUS, WIRELESS COMMUNICATION METHOD, AND COMPUTER PROGRAM

(75) Inventors: Yuichi Morioka, Kanagawa (JP); Fumihiro Nishiyama, Saitama (JP); Tomoya Yamaura, Tokyo (JP)

(73) Assignee: Sony Corporation, Tokyo (JP)

( * ) Notice: Subject to any disclaimer, the term of this patent is extended or adjusted under 35 U.S.C. 154(b) by 490 days.

(21) Appl. No.: 10/846,556

(22) Filed: May 17, 2004

(65) Prior Publication Data

US 2005/0025092 A1 Feb. 3, 2005

(30) Foreign Application Priority Data

May 26, 2003 (JP) ............................. 2003-147072

(51) Int. Cl.
*H04W 4/00* (2006.01)
(52) U.S. Cl. ........................ 370/338; 370/449; 370/459; 370/462
(58) Field of Classification Search ............ 370/395.42, 370/238, 310, 370, 338, 449, 459, 462; 455/41.2
See application file for complete search history.

(56) References Cited

U.S. PATENT DOCUMENTS 6,671,525 B2 * 12/2003 Allen et al. ................. 455/574
2003/0035396 A1 * 2/2003 Haartsen et al. ............. 370/336

* cited by examiner

*Primary Examiner*—Lester Kincaid
*Assistant Examiner*—Sayed T Zewari
(74) *Attorney, Agent, or Firm*—Oblon, Spivak, McClelland, Maier & Neustadt, P.C.

(57) ABSTRACT

The present invention is to provide each communication station with a transmission prioritised period without any useless latency in an ad-hoc communication environment including no control station. For this end, each communication station periodically transmits the beacon signal and acquires the transmission prioritised period immediately after transmission of the beacon. If the number of communication stations in the network is small, a communication station transmit a supplementary beacon within the super frame period, thereby effectively shortening the beacon interval and reducing latency at the start of transmission. At the time when a new communication station enters the network, the supplementary beacon is released in order to accommodate such new communication station.

25 Claims, 20 Drawing Sheets

WIRELESS COMMUNICATION APPARATUS, WIRELESS COMMUNICATION METHOD, AND COMPUTER PROGRAM

CROSS REFERENCE TO RELATED APPLICATION

This application claims priority from Japanese Priority Document No. 2003-147072, filed on May 26, 2003 with the Japanese Patent Office, which document is hereby incorporated by reference.

BACKGROUND OF THE INVENTION

1. Field of the Invention

The present invention relates to a wireless communication system, a wireless communication apparatus, a wireless communication method and a computer program for communicating between a plurality of wireless stations such as in a wireless LAN (Local Area Network), and more specifically to a wireless communication system, a wireless communication apparatus, a wireless communication method and a computer program for running a wireless network in which direct communications (random access) are made in an asynchronous mode between terminals. More in detail, the present invention relates to a wireless communication system, a wireless communication apparatus, a wireless communication method and a computer program in which an ad-hoc communication wireless network is established without particularly providing an apparatus acting as a control station, more specifically to a wireless communication system, a wireless communication apparatus, a wireless communication method and a computer program in which each communication station is provided with its own transmission/reception period without causing useless latency.

2. Description of Related Art

By establishing a LAN with a plurality of interconnected computers, it is possible to share information such as files and data, peripheral equipments such as printers and the like, and also to exchange information such as transmission of electronic mails and data contents. Conventionally, it is typical to construct a cabled LAN, which requires laying cables, thereby making it difficult to construct networks with minimum expense. Additionally, after constructing such network, it encountered inconvenience because moving range of equipments was restricted by the cable length.

On the contrary, a wireless LAN is increasingly attracting attention as a system for releasing users from cabling in the cabled LAN. Such wireless LAN enables to eliminate almost all cablings in the working area such as in an office or the like, thereby making it possible to relatively easily move communication terminals such as personal computers (PCs) or the like. As a result of higher operating speed and lower price of a wireless LAN system in recent years, needs for such wireless LANs are significantly increasing. Particularly in recent years, an investigation for introduction of a personal area network (PAN) have been made for performing information communications between a plurality of personal electronic equipments and appliances with a small-scale wireless network.

For example, some different wireless communication systems have been standardized by utilizing such frequency bands as 2.4 GHz and 5 GHz which require no license from an administrative government office. One of the standardized wireless communication networks is the IEEE (The Institute of Electrical and Electronics Engineers) 802.11 or the IEEE 802.15.3. As for the IEEE 802.11 standard, there are various types of wireless communication systems such as the IEEE 802.11a, the IEEE 802.11b, or the like depending on wireless communication systems, frequency bands to be used, etc.

Also, in recent years, a so-called "ultra-wideband (UWB) communication" which carries out the wireless communications by putting information on very weak impulse series is attracting attention as a short range, ultra-high speed wireless communication system, and this system is expected to be made practicable.

As for the UWB transmission system, studies have been made on various physical signal types such as a DS-UWB system in which the spreading speed of a DS (Digital Service) information signal is increased to the extreme, an impulse-UWB system in which information signal is constructed by using very short period impulse signal series in the order of several hundreds picoseconds for transmission and reception of such signal series, etc. Any one of the systems utilizes ultra-wide frequency bandwidth in the range of, for example, 3 GHz to 10 GHz. For example, spread processing is performed within the frequency bandwidth for transmission and reception, thereby realizing high speed data transmission. Its occupied bandwidth is a GHz order in which the occupied bandwidth divided by the center frequency (for example, 1 GHz to 10 GHz) is equal to substantially 1. This is much wider bandwidth as compared to the bandwidth normally used in the wireless LAN such as a so-called W-CDMA, a cdma2000, an SS (Spread Spectrum), or an OFDM (Orthogonal Frequency Division Multiplexing) system.

In the studies for standardizing, for example, the IEEE 802.15.3, standardization is in progress on a method of communicating by forming a piconet between wireless communication apparatus which perform ultra-wideband wireless communication.

In order to construct a local area network using a wireless communication technology, it is typical to provide a single apparatus acting as a control station which is known as "an access point" or "a coordinator" in the area and the network is formed under supervising control of the control station.

In case of transmitting information from a certain communication apparatus in a wireless network having an access point, widely used is an access control method based on a reserved bandwidth in which a bandwidth necessary for transmitting the information is firstly reserved from the access point in order to use the transmission path so that no collision takes place with information transmission by another communication apparatus. In other words, the access point is provided to perform synchronized wireless communication in which all communication apparatus in the wireless network are synchronized with each other.

However, there arises a problem to significantly decrease efficiency of using the transmission path in case of performing asynchronous communication between a transmitter side and a receiver side in the wireless communication system having the access point because it is absolutely necessary to perform wireless communication through the access point.

On the contrary, as another method of constructing a wireless network, a so-called "ad-hoc communication" for directly performing asynchronous communication between terminals has been proposed. Particularly, in a small-scale wireless network comprising a relatively small number of clients that locate close to each other, it is considered that such ad-hoc communication is suitable because any terminal can directly perform asynchronous wireless communication without using a particular access point.

Now, a conventional wireless networking will be described hereunder in detail by taking the IEEE 802.11 as an example.

The networking in the IEEE 802.11 is based on the concept of a BSS (Basic Service Set). The BSS comprises two kinds, one is a BSS as defined by an infrastructure mode including a master such as an AP (Access Point or a control station) and the other is an IBSS (Independent BSS) as defined by only an ad-hoc mode including a plurality of MT (Mobile Terminals or movable stations).

Infrastructure Mode:

An operation of the IEEE 802.11 in the infrastructure mode will be described by reference to FIG. 26. An AP to perform coordination is essential in a BSS in the infrastructure mode.

An AP integrates the area where a radio wave reaches in the periphery of its own station as a BSS and constitutes a so-called "cell" in a cellular system. MTs in the neighborhood of the AP are accommodated in the AP and enter the network as a member of the BSS. In other words, the AP transmits a control signal, which is known as a beacon, at an appropriate time interval. Any MT capable of receiving the beacon is considered to be located near the AP and establishes a connection with the AP.

In the example as shown in FIG. 26, a communication station STA0 operates as the AP and the other communication stations STA1 and STA2 operate as the MTs. Note that the STA0 as the AP transmits the beacon at a constant interval as show in the chart at the right side in FIG. 26. The transmission time of the next subsequent beacon is informed in the beacon as a parameter of target beacon transmit time (TBTT). And when it comes to the TBTT, the AP initiates the beacon transmission procedure.

Upon receiving the beacon, neighboring MTs decode the internal TBTT field for recognizing the next subsequent beacon transmission time, thereby making it possible to shut-off the power of the receiver and to enter the sleeping state until the TBTT for the next subsequent or some later TBTT depending on the case (or in case when reception is unnecessary).

Ad-Hoc Mode:

Now, the operation of the IEEE 802.11 in another or the ad-hoc mode will be described by reference to FIG. 27 and FIG. 28.

In the IBSS in the ad-hoc mode, MTs automatically define the IBSS after performing negotiation among a plurality of MTs. Upon defining the IBSS, a group of MTs determine the TBTT at a constant interval after such negotiation. Upon recognizing arrival of the TBTT by making reference to the clock within its own station, each MT transmits the beacon after a random time delay in case when it recognizes that no other MTs transmit the beacon.

The particular example as shown in FIG. 27 shows that two MTs constitute the IBSS. In this case, the beacon is transmitted by either one of the two MTs belonging to the IBSS at every time when the TBTT is reached. Also, there is a case when collision of beacon takes place.

Even in the IBSS, there is an instance when the power supply of the MTs is shut off as necessary, thereby going into a sleeping state. FIG. 28 shows signal transmission and reception procedures in this case.

In case when the sleep mode is applied in the IBSS in the IEEE 802.11, a certain time frame from the TBTT is defined as an ATIM (Announcement Traffic Indication Message) window. In the time frame of the ATIM window, all MTs belonging to the IBSS are operating the signal reception procedures. Any MT operating in the sleep mode is basically capable of receiving in this time frame.

In case when each MT has information to be sent to a certain designated MT, it is possible to transmit ATIM packets to the designated MT after transmitting the beacon in the ATIM window, thereby informing the receiver side that the MT holds information to the designated MT. The MT that received the ATIM packets keeps the receiver operating until the end of reception from the ATIM packets transmitting station.

In the example as shown in FIG. 28, there are three MTs, i.e., a STA1, a STA2 and a STA3 in the IBSS. When the TBTT arrives in FIG. 28, each MT of the STA1, STA2 and STA3 sets its backoff timer while monitoring the media condition over the random interval. The example in FIG. 28 shows the case when the timer of the STA1 disappears earlier than the others and transmits the beacon. Since the STA1 transmits the beacon, the other SAT2 and STA3 which receive the beacon are refrained from transmitting the beacon.

Also, in the example in FIG. 28, the STA1 holds the transmission information addressed to the STA2 while the STA2 holds the transmission information addressed to the STA3. At this time, both the STA1 and STA2 set the backoff timer again while monitoring the respective media condition over the random time interval after transmission/reception of the beacon. In the shown example, since the timer of the STA2 disappears earlier, the ATIM message is transmitted first from the STA2 to the STA3. Upon receiving the ATIM message, the STA3 feeds the receiving ACK (acknowledge) packet back to the STA2. Upon completion of transmission of the ACK from the STA3, the STA1 further sets the backoff timer while monitoring the respective media condition over the random time interval. When the timer disappears, the STA1 transmits the ATIM packet to the STA2. The STA2 feeds the ACK packet of receiving the ATIM packet back to the STA1.

Upon performing communication of these ATIM packet and ACK packet in the ATIM window, the STA3 operates the receiver in order to receive information from the STA2 in the subsequent interval while the STA2 operates the receiver in order to receive information from the STA1.

In the above procedures, communication stations which do not receive the ATIM packet in the ATIM window or do not hold information to be transmitted to any other station can shut off the power of the transmitter/receiver until the next subsequent TBTT, thereby reducing power consumption.

Incidentally, information processing equipment such as personal computers (PCs) come into wide use and offices are in a working environment where a variety of equipments are included, thereby including communication stations spreading all over and constructing a plurality of networks in overlapped with one another. Under such circumstances, there arises a need for an access control so that communications between terminals do not conflict with one another.

In a packet communication or the like in which communication requests are in random and burst manner, it is typical to adopt a common channel system in which a plurality of terminal stations share the same frequency channel. Since communication requests from terminal stations are random in the common channel system, it is most likely that signals from a plurality of terminal stations collide with one another, thereby degrading communication quality. In order to avoid such signal collision, a CSMA/CA (Carrier Sense Multiple Access/Collision Avoidance) system is widely adopted because it comprises a relatively simple mechanism. In the ad-hock communication system as described hereinabove, a direct, asynchronous information transmission system is applied in accordance with the access procedures based on the CSMA/CA in order to detect that the communication from the own station does not collide with the others.

On the other hand, in case of transmitting real-time and continuous data such as dynamic images and the like which require to transmit data periodically at a constant interval, bandwidth must be guaranteed. In such a case, bandwidth is guaranteed by giving a period of time for each communication station constituting the network to prioritize transmission/reception.

However, if a constant prioritized transmission/reception right is given in case of relatively small number of communication stations, there is a problem to cause useless latency. It is to be noted that the term "latency" means herein a waiting time or a delay time from the time when an instruction is sent to the time when an actual result or response is received. Reduction of such latency can be realized by shortening the waiting time before starting communication or increasing the transmission rate.

SUMMARY OF THE INVENTION

It is therefore one aspect of the present invention to provide an excellent wireless communication system, a wireless communication apparatus, a wireless communication method and a computer program which establishes a wireless network by ad-hoc communication without particularly providing an apparatus acting as a control station.

It is a further aspect of the present invention to provide an excellent wireless communication system, a wireless communication apparatus, a wireless communication method and a computer program which are capable of giving a transmission/reception period to each communication station without causing useless latency under ad-hoc communication environment which does not include a control station.

In light of the problems as described hereinabove, a first aspect of the present invention is a wireless communication system for establishing a wireless network based on an ad-hoc communication between a plurality of wireless communication apparatus without providing a control station, and characterized in that each communication station transmits a beacon by determining a beacon transmission position within the predetermined frame period, acquires a prioritized transmission/reception period immediately after transmitting the beacon and shortens the beacon transmission interval in case when reduction of latency is requested or when there is a sufficient room in the frame period.

It is to be noted that "the system" means logical collection of a plurality of apparatus (or functional modules to achieve a particular function) whether or not each apparatus or functional module is accommodated in a single packaging.

The wireless communication system according to the present invention does not particularly need a coordinator. Each communication station transmits beacon information in order to notify its presence to other neighboring communication stations (within the communication area) as well as notifying the network configuration. Also, any communication station which newly enters the communication area of a given communication station receives the beacon signal to recognize entrance to the communication area and understand the network configuration by reading the information carried by the beacon signal.

In case where no communication station is located in the neighborhood, a communication station can start transmitting of the beacon at any desired timing. Thereafter, any communication station which newly enters the communication area sets the transmission timing of its own beacon so as not to collide with the existing beacon positions. At this time, since each communication station acquires a prioritized period to use immediately after transmitting the beacon, the beacon positioning is carried out in accordance with an algorithm for sequentially setting a newly entered station at substantially the center of the beacon intervals set for the existing communication stations.

Each communication station records its own beacon receiving timing in the neighboring beacon information field of the beacon and manages the network by listing neighboring stations which are located in the neighborhood of the communication station within the frame period based on its own beacon receiving timing and the records in the neighboring beacon offset information (NBOI) of the receiving beacon.

Because of the collision of beacon avoidance function based on the records in the NBOI field, the beacon position of a hidden terminal, i.e., a neighboring station to the next station can be recognized for avoiding collision of beacon.

Incidentally, in case of keeping the beacon transmission timing constant even if the number of communication stations is small, there is a problem to cause useless latency before it comes to the transmission start timing. The term "latency" means herein the waiting time or delay time until a result is actually returned after sending an instruction. That is, in a system in which transmission is permitted only immediately after transmitting the beacon by the receiving communication station, the maximum latency from the time when it wants to transmit to the time when it is actually permitted to transmit is close to the frame period. Although the frame period should be set in response to the maximum number of stations to be accommodated in the network, it fails to cope with variable number of communication stations and thus waist is caused in case when the number of accommodated stations is small.

Accordingly, in the wireless communication system according to the present invention, when the number of communication stations in a communication area is small, a communication station is permitted to transmit a plurality of beacon signals within a frame period, thereby introducing a mechanism to reduce latency as a result of effectively shortening the beacon interval in a pseudo form and acquiring the transmission/reception period immediately after transmitting the beacon. In other words, latency can be reduced by shortening the beacon interval, shortening the waiting time before starting communication or increasing the transmission rate.

Since second and subsequent beacons in the frame period are transmitted for the primary purpose of acquiring transmission/reception periods, they are different from the original beacons which are transmitted for establishing the network. Accordingly, they are so-called surplus beacons or supplementary beacons but they are referred to as "the supplementary beacons" in this specification.

Any communication station which recognizes a sufficient room in the beacon interval can report its desire of adding the supplementary beacon(s) in the broadcast. At this time, such information as the scheduled time to add the supplementary beacon(s) and the like are included in the report. If consent responses are received from all of the communication stations within a predetermined time or if no rejection response is received from any communication station within the predetermined time, supplementary beacon(s) is added at the predetermined timing.

On the other hand, the minimum beacon interval is regulated so that the beacons do not overflow in the frame period, thereby restricting the maximum number of communication stations to be accommodated within the frame period. Accordingly, when a new communication station tries to enter, it is necessary to release the supplementary beacon(s) in order to accommodate the new corner in the frame period. For example, the new communication station or any communication station which needs to reduce latency should request the release of the transmission position of the supplementary beacon(s) to the other communication station which is transmitting the supplementary beacon(s).

Other than adding such supplementary beacon(s) in the frame period, it is possible to reduce latency before starting transmission by shortening the frame period and thus shortening the beacon interval. It is to be noted that the former approach is effective to reduce latency of the particular communication station which added the supplementary beacon(s) while the latter approach is effective to reduce latency equally to all communication stations whose beacons are accommodated in the super frame period.

Any communication station which recognizes that the number of communication stations accommodated in the frame period is small can propose in the broadcast that the frame should be shortened. If consent responses are received from all of the accommodated communication stations within a predetermined time or if no rejection response is received from any communication station within a predetermined time, the frame shortening is carried out.

Also, in case of reducing latency by shortening the frame period, it is necessary to acquire the resources for the beacon transmission position when there is a new communication station to enter the wireless network or when a particular communication station needs to newly transmit supplementary beacon(s). In such circumstances, the shortened frame period must be extended to the initial length.

When the number of accommodated communication stations becomes large, a frame extension will be reported in order to acquire sufficient periods for the prioritized transmission/reception by each communication station. By extending the frame period, the number of beacons to be positioned within the frame period is increased, thereby effectively obtaining the same effect as releasing the resources.

Now, another aspect of the present invention is a computer program which is described in a computer readable format for performing the communication operation under a wireless communication environment without providing a particular control station, and comprising: a beacon transmission step for transmitting the beacon within the predetermined frame period; and a beacon transmission position control step for shortening the beacon interval in response to the reduction of latency or the room in the beacon interval within the frame period, and for extending the beacon interval in response to the shortage of the beacon interval due to participation of a new communication station or withdrawal of the requests for reducing latency.

The computer program according to the second aspect of the present invention is the computer program as described in a computer readable format which is defined to perform predetermined processing on a computer system. In other words, upon installing the computer program according to the second aspect of the present invention on a computer system, it cooperates with the computer system to operate as the wireless communication apparatus. By constructing the wireless network together with a plurality of such wireless communication apparatus, it is possible to achieve the same effect as the wireless communication system according to the first aspect of the present invention.

Additional objects, features and advantages of the present invention will become apparent by reading the following descriptions based on the accompanying drawings.

According to the present invention, it is possible to provide an excellent wireless communication system, a wireless communication apparatus, a wireless communication method and a computer programs therefore which are suitable to establish a wireless network by an ad-hoc communication without particularly providing an apparatus acting as a control station.

Also, according to the present invention, in an ad-hoc communication environment without any control station, it is possible to provide a wireless communication system, a wireless communication apparatus, a wireless communication method and a computer program therefore in which each communication station is provided with a transmission prioritised period without causing useless latency.

According to the present invention, it is possible to permit a communication station having high communication demands to position more supplementary beacons, thereby effectively securing a wider bandwidth.

DETAILED DESCRIPTION OF THE PREFERRED EMBODIMENTS

Now, embodiments of the present invention will be described in detail hereunder by reference to the accompanying drawings. The communication propagation path applying the present invention is wireless which is a single transmission medium (in case of non-separated link by frequency channel) for establishing a network between a plurality of communication stations. It is to be noted that the advantages of the present invention can be enjoyed in case where a plurality of frequency channels exist as transmission medium. Also, the communication to be adopted in the present invention is a store-and-forward switching type traffic in which information is transferred in packets.

The wireless network system according to the present invention adopts a system configuration excluding a coordinator and each communication station performs an ad-hoc communication to transmit information directly in an asynchronous mode in accordance with access procedures based basically on the CSMA.

In such wireless communication system having particularly no coordinator, each communication station notifies its presence and the network configuration to other neighboring (i.e., within the communication area) communication stations by transmitting beacon information. Also, any communication station which newly enters the communication area of a given communication station receives beacon signals from the other communication stations to detect that the communication station enters the communication area and to recognize the network configuration by decoding the information coded in the beacon.

Processing described hereinafter performed at each communication station is basically the processing which is performed by all communication stations participating in the network. However, it is to be noted that not all communication stations constituting the network necessarily perform the processing which will be described hereinafter.

Figure 1:
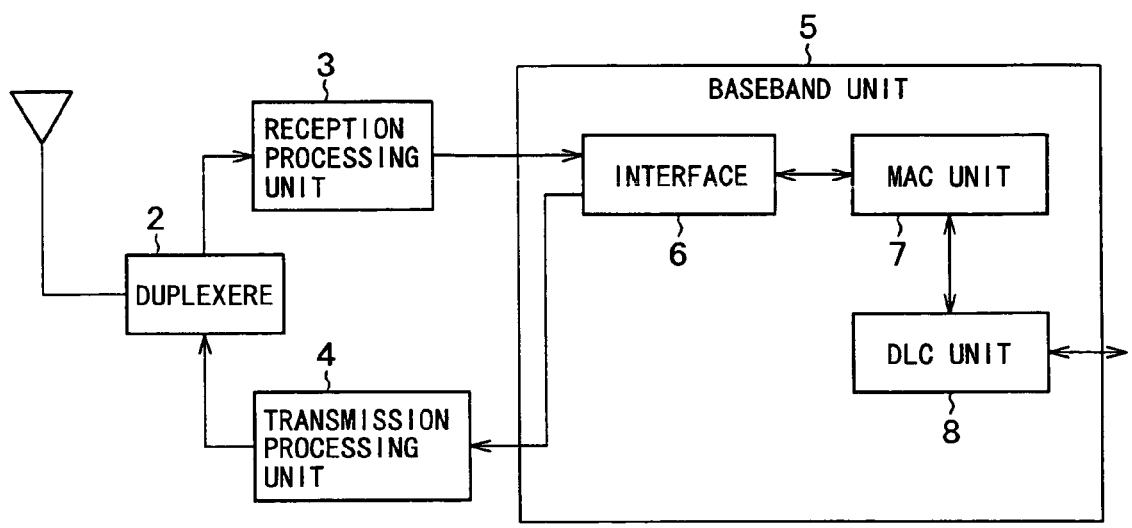
FIG. 1 is a diagrammatic functional construction of the wireless communication apparatus capable of operating as a communication station in the wireless network according to the present invention.

FIG. 1 shows a diagrammatic functional construction of the wireless communication apparatus which operates as a communication station in the wireless network according to the present invention. In the wireless communication apparatus as shown in FIG. 1, an antenna 1 is connected to a reception processing unit 3 and a transmission processing unit 4 by way of a duplexer 2. The reception processing unit 3 and the transmission processing unit 4 are connected to a baseband unit 5. A reception processing method in the reception processing unit 3 and a transmission processing method in the transmission processing unit 4 may adopt various communication systems suitable for relatively short-range communication and capable of applying to, for example, a wireless LAN. Specifically, the UWB system, the OFDM system, the CDMA system or the like is applicable.

The baseband unit 5 comprises an interface 6, a MAC (Media Access Control) unit 7, a DLC (Data Link Control) unit 8 and the like. These processing units perform respective processing of each communication protocol layer in the access control system which is installed in the communication system.

Now, description will be made on operations that the wireless communication apparatus will perform in the wireless network system according to the present invention. In a wireless communication environment excluding a coordinator, each communication station periodically transmits the beacon for the purpose of notifying its presence to other neighboring (i.e., within its communication area) communication stations. Each communication station acquires a prioritized period to be used for transmitting (transmitting/receiving) information to others for a predetermined period immediately after transmission of the beacon.

Each period sectioned by beacon transmission is referred to as "the super frame period". In this particular embodiment, the transmission period of the beacon from each communication station is set to 40 msec. Although the beacon signal is transmitted in every 40 msec, the super frame period should not be restricted to 40 msec.

Figure 2:
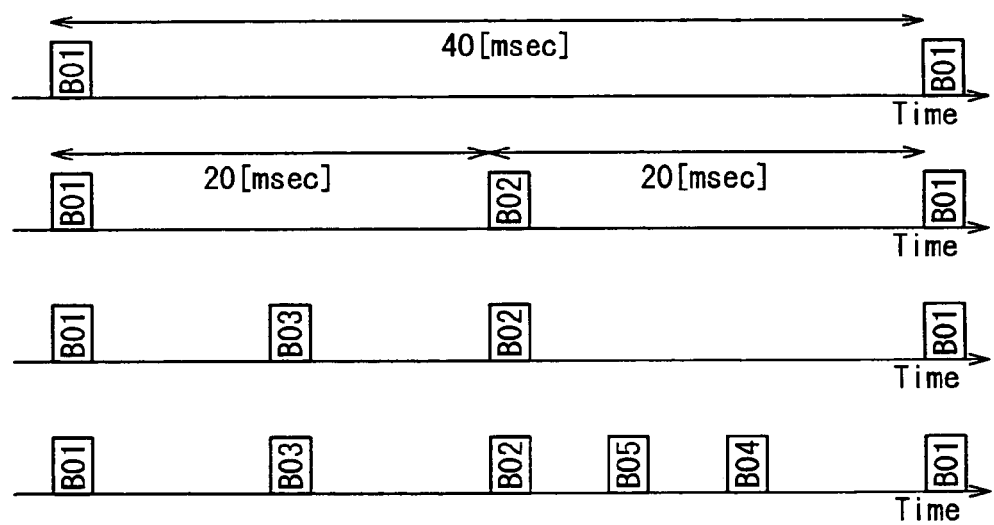
FIG. 2 is a chart to describe beacon transmission procedures of each communication station.

Now, beacon transmission procedures of each communication station according to the present invention will be described by reference to FIG. 2. If it is assumed that information transmitted by the beacon is 100 Bytes, then the time required for transmission is 18 μsec. Since it is transmitted once in every 40 msec, media occupation percentage by the beacon of each communication station is as low as $1/2222$.

Each communication station STA listens to the beacons transmitted from neighboring communication stations and slowly synchronizes with them. In an instance when a new communication station appears, it sets its own beacon transmission timing so that it does not collide with beacon transmission timing of the existing communication stations.

In an instance when there are no neighboring communication stations, the communication station 01 is able to start transmitting its beacon at any desired timing. The transmission period of the beacon is 40 ms (as mentioned hereinabove). In the example as shown at the top in FIG. 2, a B01 indicates the beacon position transmitted by the communication station 01.

Subsequently, any communication station which newly enters the communication area sets its own beacon transmission timing so as not to collide with the existing beacon positions. Since each communication station acquires a prioritized period to use (or transmission prioritised period) immediately after transmission of the beacon, it is preferable in terms of transmission efficiency that beacon transmission timings of communication stations are evenly scattered within the super frame period rather than densely positioned. Accordingly, in the particular embodiment, each communication station is basically designed to start transmitting its beacon at substantially the center of the longest time frame between adjacent beacons that the communication station can listen.

For example, it is assumed that a new communication station 02 appears in the network configuration including only the communication station 01 as shown at the top in FIG.

2. At this time, the communication station 02 recognizes the presence and the beacon position of the communication station 01 by receiving the beacon B01 from the communication station 01 and starts to transmit its beacon B02 by setting the beacon position at substantially the center of the beacon interval of the communication station 01 as shown in the second timing chart from the top in FIG. 2.

Furthermore, it is assumed that another new communication station 03 appears. At this time, the communication station 03 receives at least one of the beacons B01 and B02 from the communication station 01 and the communication station 02 and recognizes the presence of these existing communication stations. Then, the communication station 03 starts to transmit its beacon B03 at substantially the center position of the interval between the two beacons B01 and B02 from the communication stations 01 and 02 as shown by beacon B03 in the third chart from the top in FIG. 2.

Thereafter, the beacon interval becomes narrower as new neighboring communication stations enter the network in accordance with the same algorithm. For example, as shown in the bottom chart in FIG. 2, a communication station 04 which enters after the communication station 03 sets its beacon transmission timing at substantially the center timing of the beacons B02 and B01 from the communication stations 02 and 01 as shown by beacon B04 while a further newly entering communication station 05 sets its beacon transmission timing at substantially the center timing of the beacons B02 and B04 from the communication stations 02 and 04 as shown by beacon B05.

However, it is to be noted that the minimum beacon interval Bmin is set so that beacons do not overflow from the bandwidth (super frame period). It is assumed, for example, that the minimum beacon interval Bmin is regulated to 625 μsec, only up to 64 communication stations can be accommodated in the service area of the radio wave.

Figure 3:
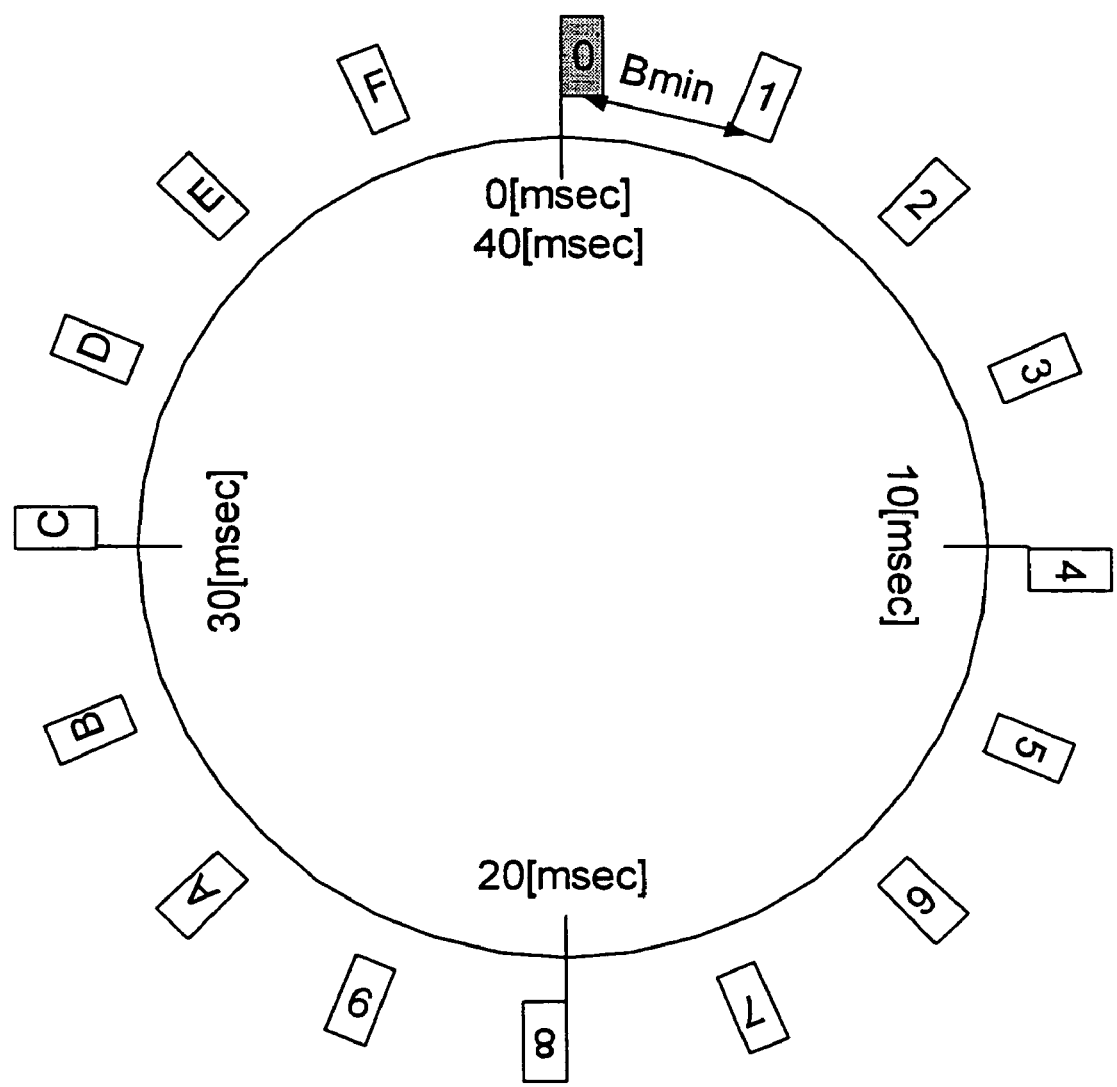
FIG. 3 is an example of the beacon transmission timing.

FIG. 3 shows an example of the beacon transmission timing. However, in the example as shown in FIG. 3, time lapse of the 40 msec super frame period is indicated by a hand of a clock which rotates clockwise on a circle.

In the example as shown in FIG. 3, total 16 communication stations from 0 to F constitute nodes of the network. It is assumed that the beacon positioning is set in accordance with the algorithm to sequentially set the timing for newly entered communication stations at substantially the center of the beacon intervals set by the existing communication stations as described hereinabove by reference to FIG. 2. In case of regulating the Bmin to 2.5 msec, no more communication stations can enter the network. Such phase of starting to transmit the beacon from each communication station at the positions in accordance with the above procedures is referred to as "the step 1" below. Detailed procedures of determining the beacon transmission positions will be described hereinafter.

In the wireless network according to the embodiment of the present invention, it basically adopts the access procedures based on the CSMA similar to the conventional procedures, i.e., transmission is carried out after confirming that the medium is clear prior to transmission. However, after transmitting the beacon signal to let the other neighboring communication stations know its presence, each communication station acquires the prioritized period to use in which the communication station can transmit information in priority over others.

Figure 4:
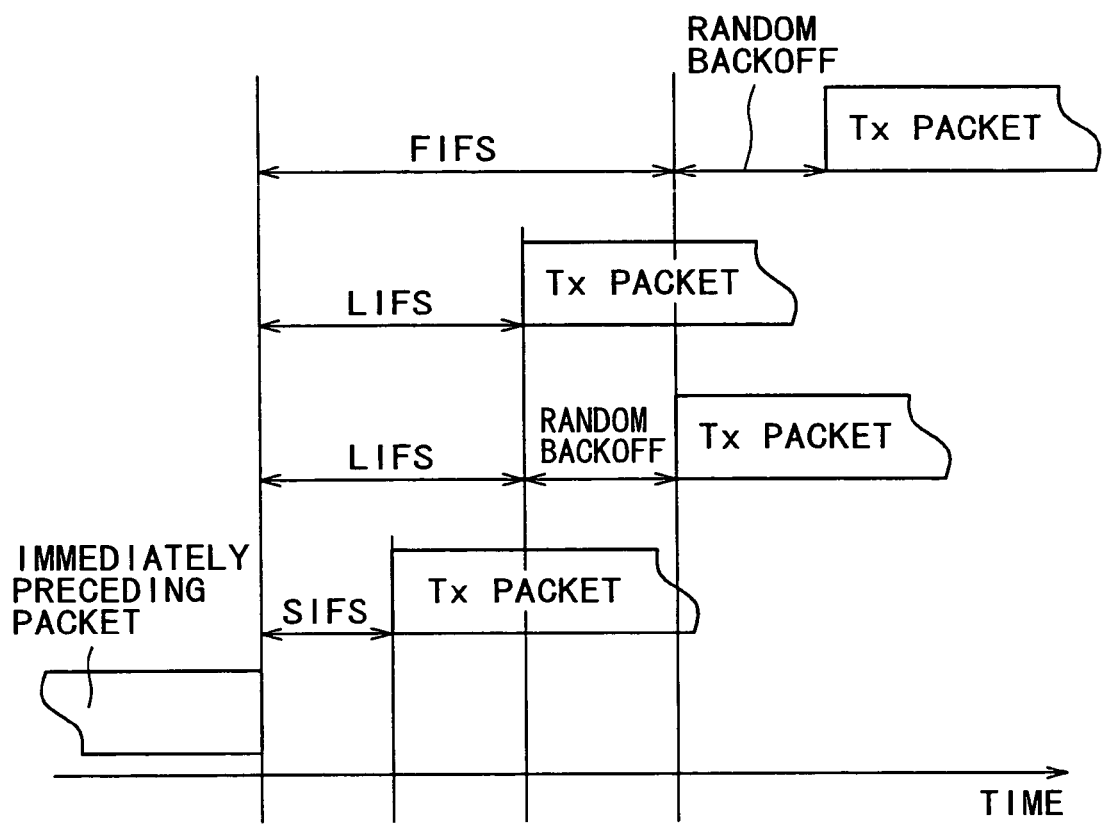
FIG. 4 is a chart to define packet intervals.

Similar to the case of the IEEE 802.11 system or the like, a plurality of packet intervals can be defined as well in this particular embodiment. Now, definition of the packet interval in this embodiment will be described by reference to FIG. 4.

The packet interval defines a SIFS (Short Inter Frame Space) and a LIFS (Long Inter Frame Space). The SIFS packet interval is granted only to the prioritized packets and other packets are permitted to be transmitted in LIFS plus the random backoff packet interval which is acquired in random after confirming that the medium is clear. Any known method can be applied to a calculation method of the random backoff value.

Moreover, in the particular embodiment, "LIFS" and "FIFS (Far Inter Frame Space)+backoff" are defined other than the above described "SIFS and LIFS+backoff". Although the "SIFS" and "LIFS+backoff" packet intervals are normally adopted, in time frames when the prioritized transmission right is granted to a certain communication station, other communication stations use the "FIFS+backoff" packet intervals and the communication station to which the priority right is granted uses the SIFS or LIFS packet intervals.

Figure 5:
FIG. 5 is a timing chart to show the way how the prioritized transmission right is granted to the station which transmitted the beacon.
Figure 6:
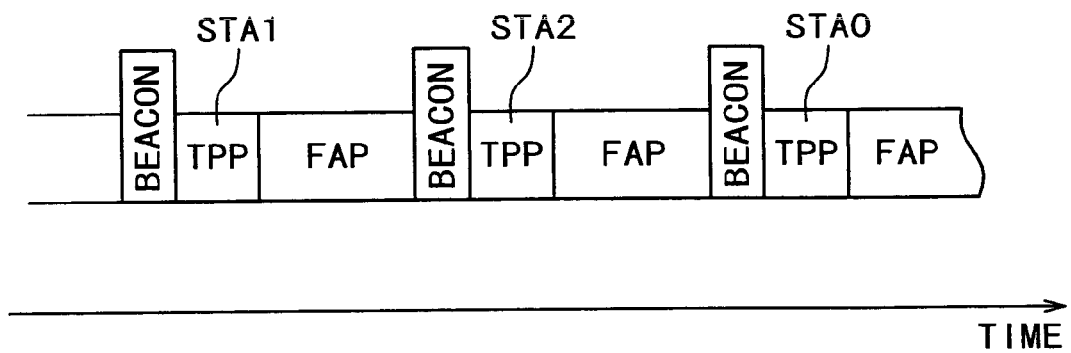
FIG. 6 is a timing chart to show the prioritized transmission period and the conflicting transmission period within a super frame period.

Although each communication station transmits the beacon at a constant period, the priority right is granted to the communication station which transmitted the beacon for a certain time after transmitting the beacon. FIG. 5 shows how the priority right is granted to the beacon transmitting station. The prioritized period is defined as a TPP (Transmission Prioritised Period) while the remaining periods other than the TPP are defined as a FAP (Fairly Access Period). FIG. 6 shows a structure of the super frame period. As shown in FIG. 6, subsequent to transmission of the beacon from each communication station, the TPP for the particular communication station which transmitted the beacon is allocated and after the lapse of time equal to the TPP, the FAP follows until it terminates at the transmission of the beacon by the next subsequent communication station. Although the TPP started immediately after transmission of the beacon in this particular example, the invention should not be limited only to such example and the commencing time of the TPP may be set to, for example, any relative position (time) with respect to the beacon transmission time.

Now, the packet interval will be studied again hereunder. Each communication station transmits in the FAP at the interval of the LIFS+backoff. On the other hand, as to transmission of the beacon and the packets within its own TPP, it is permitted to transmit at the SIFS interval. As to the packet transmission within its own TPP, transmission at the LIFS interval is also permitted. On the other hand, as to packet transmission within the TPP granted to other communication stations, it is transmitted at the FIFS+backoff interval. Although the packet interval is always equal to the FIFS+backoff in the IEEE 802.11 system, the interval can be more dense in the present arrangement, thereby achieving more efficient packets transmission.

Although it is described in the above example that the prioritized transmission right is granted only to the communication station in the TPP, such prioritized transmission right can also be granted to the communication station accessed by the communication station in the TPP. Although transmission is basically prioritized in the TPP, in case where there is nothing to send in the own (or calling) communication station but it is known that the other communication station holds information to be transmitted to the calling communication station, it is possible to send a paging message or a polling message to "the other" communication station.

On the contrary, in case when the beacon is transmitted but the communication station has nothing to send and when it is unknown if the other communication station holds any information to be transmitted to the calling communication station, it is possible that the communication station do nothing and abandon its prioritized transmission right granted in the TPP, thereby transmitting nothing. As a result, any other communication station can start transmission even in the time frame after lapse of the LIFS+backoff or the FIFS+backoff.

In consideration of the structure in which the TPP follows immediately after the beacon as shown in FIG. 6, it is preferable in terms of transmission efficiency that beacon transmission timings of the communication stations are equally spread within the super frame period rather than densely concentrated. Accordingly, in the particular embodiment, the beacon transmission is basically started at substantially the center of the longest time band of the beacons in the area where the communication station can listen.

Figure 7:
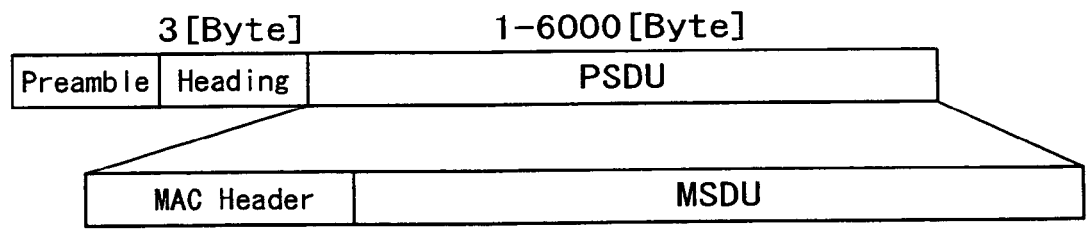
FIG. 7 is an example of the packet format.

FIG. 7 shows an exemplified packet format in the wireless network system according to one embodiment of the present invention. Added at the head of a packet is a preamble which comprises a unique word for the purpose to let the other communication stations know the presence of each communication station.

Transmitted immediately after the preamble is a heading section where attribute, length and transmission power of the packet are stored and also stored is the transmission rate of the payload portion if the PHY is in the multi-transmission rate mode. The transmission rate of the heading portion is decreased so that the required SNR can be lower than the payload portion by about several dB. The heading portion differs from the so-called MAC header. In the shown example, the MAC header is included in the payload portion. The payload portion is a portion as indicated PSDU (PHY Service Data Unit) for storing bearer bit series which include control signals and information. The PSDU comprises the MAC header and the MSDU (MAC Service Data Unit) and it is the MSDU portion where data series transferred from the higher layer are stored.

In the following descriptions, in order to describe concretely, it is assumed that the length of the preamble is 8 μsec, the bit rate of transmission of the payload portion is 100 Mbps and the heading section is 3 Bytes and transmitted at 12 Mbps. In other words, in order to transmit or receive one PSDU, there causes 10 μsec (8 μsec preamble+2 μsec heading) overhead.

Figure 8:
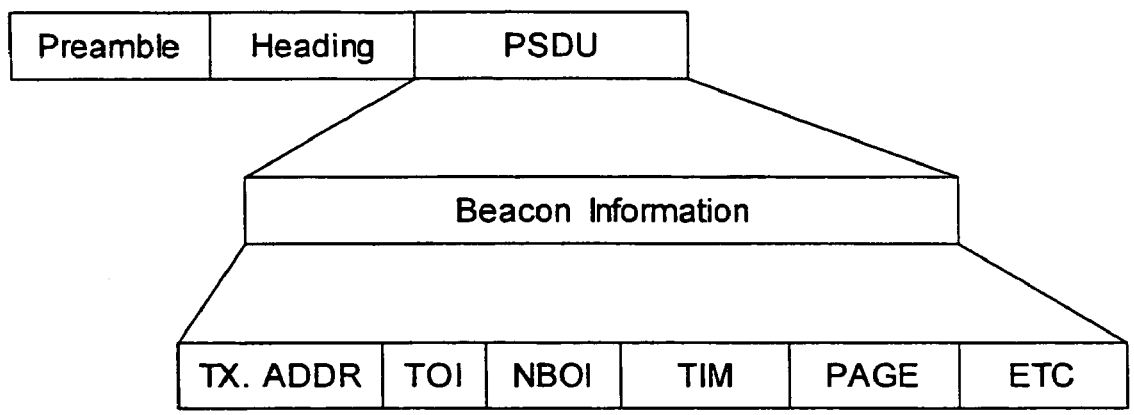
FIG. 8 is an example of the beacon signal format.

FIG. 8 shows an example of the beacon signal format. As shown in FIG. 8, the beacon signal comprises a preamble to let the other communication stations know the presence of a particular communication station followed by a heading and a payload portion PSDU. It is the heading portion to carry information that the packet is the beacon. Also contained in the PSDU is the following information to be informed to the other communication stations.

Tx. ADDR: MAC address of the transmitter (Tx)
TOI: TBTT Offset Indication
NBOI: Neighbor Beacon Offset Information
TIM: Traffic Indication Map
PAGE: paging TIM is information to notify that the communication station currently holds information to be transmitted to particular communication stations. Reference is made to TIM in order to recognize that the receiving station must receive. Paging is a field to indicate that one of the receiving stations listed in the TIM is scheduled to transmit at the next subsequent TPP. The communication station which is designated in the field must prepare for reception in the TPP. Another field (i.e., ETC field) is also prepared.

The NBOI is information which describes beacon positions of neighbor communication stations. Since there are up to 16 beacon positions within the super frame period in this particular embodiment, the NBOI is constructed as a 16 bits long field corresponding to each beacon position and describes the information regarding the received beacon positions in a bit map format. And, by setting the beacon transmission timing of the own station as a reference, 1 is written as a bit at a relative position corresponding to the beacon receiving timing from each communication station while remaining 0 at the bit position corresponding to the relative positions where no beacons are transmitted.

Figure 9:
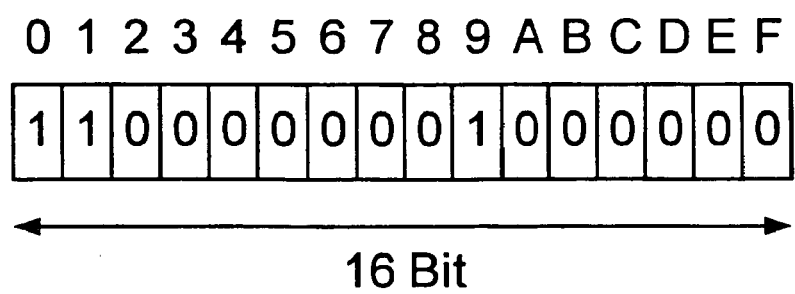
FIG. 9 is an example of a NBOI description.

FIG. 9 shows an example of describing the NBOI. In the example as shown in FIG. 9, the NBOI field indicates that the communication station 0 as shown in FIG. 3 is "capable of receiving beacons from the communication station 1 and the communication station 9". Regarding the bits corresponding to the relative positions of the beacons which are capable of receiving, a mark is allocated if the beacon is received while allocating a space if not received. It is to be noted, for other purposes, that marks may be used at the bit locations corresponding to the timing when no beacons are received. In this particular embodiment, communication stations receive beacons from one another in order to avoid collision of beacon based on the description of the NBOI in each beacon.

Figure 10:
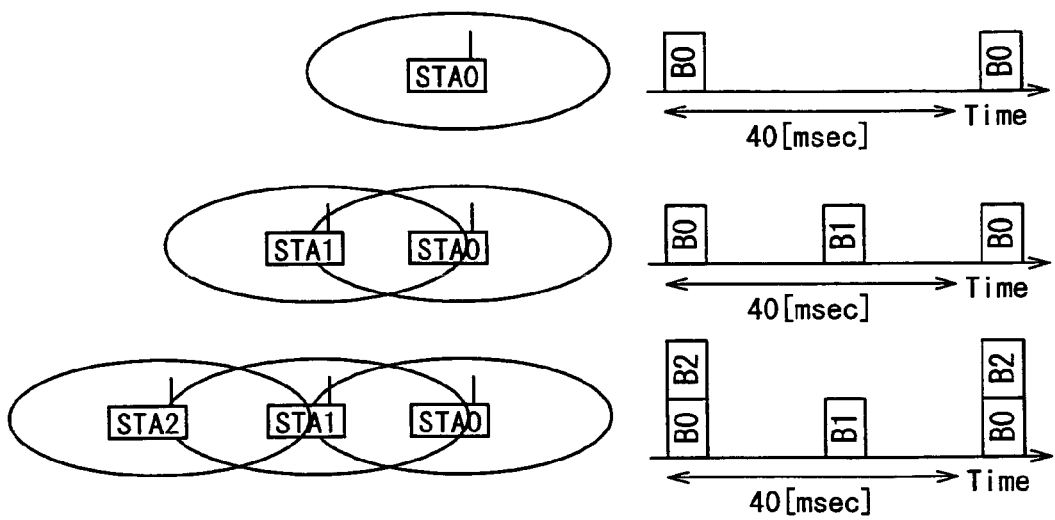
FIG. 10 is a chart to describe the mechanism of collision of beacon avoidance by using a NBOI.

FIG. 10 shows how each communication station avoids collision of beacon based on the description of the NBOI. The way how the communication stations STA0 to STA2 enter is shown in each stage in FIG. 10, wherein the location of each communication station is shown at the left side in each stage while showing the position of the beacon transmitted from each communication station at the right side.

Shown in the top stage in FIG. 10 is the condition when only station STA0 presents. At this time, the communication station STA0 tries to receive beacons but no beacons can be received. As a result, the communication station STA0 arbitrarily sets the beacon transmission timing and transmits the beacon whenever the beacon transmission timing arrives. The beacon is transmitted at every 40 msec. All bits in the NBOI field carried in the beacon from the communication station STA0 are 0 at this time.

Shown in the second stage in FIG. 10 is an instance when another communication station STA1 enters the communication area of the communication station STA0. The STA1 tries to receive beacons and successfully receives the beacon from the STA0. Since all bits in the NBOI field of the beacon from the STA0 are 0 except the bit at its own transmission timing, the STA1 sets its beacon transmission timing at the substantially center of the beacon interval from the STA0 in accordance with the step 1 which has been described hereinabove.

The NBOI field of the beacon which is transmitted from the STA1 is set to 1 in the bits corresponding to the beacon transmission timing from its own station and the beacon receiving timing from the STA0 while filling 0 in all other bits. Also, upon recognizing the beacon from the STA1, the STA0 sets the corresponding bit position in the NBOI field to 1.

Shown in the bottom stage in FIG. 10 is an instance when the STA2 subsequently enters the communication area of the communication station STA1. In the shown example, the STA0 is a hidden terminal to the STA2. Accordingly, since the STA2 is unable to recognize that STA1 is receiving the beacon from the STA0, it is possible that the STA2 transmits the beacon at the same timing as the STA0, thereby causing collision as shown at the right side.

Figure 11:
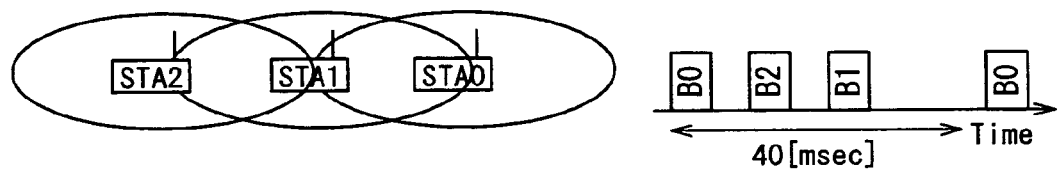
FIG. 11 is a chart to show the way how the beacon transmission timing of a newly entered communication station STA2 is determined at substantially the center of beacon intervals between STA0 and STA1.

The NBOI field is used in order to avoid this phenomenon. Firstly, the NBOI field in the beacon from the STA1 sets 1 not only at the bit representing its own transmission timing but also at the bit representing the beacon transmission from the STA0. As a result, although the STA2 is unable to directly receive the beacon which the STA0 is transmitting, it recognizes the timing of the beacon which the STA0 is transmitting based on the beacon received from the STA1, thereby avoiding transmission of the beacon at this particular timing. Accordingly, the STA2 sets the beacon transmission timing at substantially the center of the beacon intervals from the STA0 and the STA1 as shown in FIG. 11. Of course, 1 is set to the bit of the NBOI in the beacon which is transmitted from the STA2 at the beacon transmission timing of the STA2 and the STAL.

According to the collision of beacon avoidance function based on the description in the NBOI field as described hereinabove, it is possible to recognize the beacon position of the hidden terminal, i.e., a next station beyond the neighbor station, thereby enabling to avoid collision of beacon.

As described hereinabove, the wireless communication system according to this particular embodiment is an autonomous distributed network to be constructed in such a manner that each communication station can periodically transmit the beacon signal at the constant interval. In other words, each communication station transmits the beacon information to let the other communication stations know the presence of its own station as well as the network configuration. Also, any new communication station to enter the network detects that the communication station enters the communication area by receiving beacon signals and interpreting the information included in the beacons, thereby constructing a new network by transmitting its beacon in such a manner to avoid collision with the existing beacon signals.

Moreover, each communication station acquires a predetermined given period immediately after transmission of its own beacon as a transmission prioritised period TPP in which the communication station has a priority right to use for information transmission (transmission and/or reception). However, in case of maintaining the beacon transmission timing constant interval when the number of communication stations is small, there is a problem to cause useless latency until the next communication timing arrives. Herein, the term latency means the waiting time or the delay time from the time when an instruction is transmitted to the time when the result is actually received.

Figure 12:
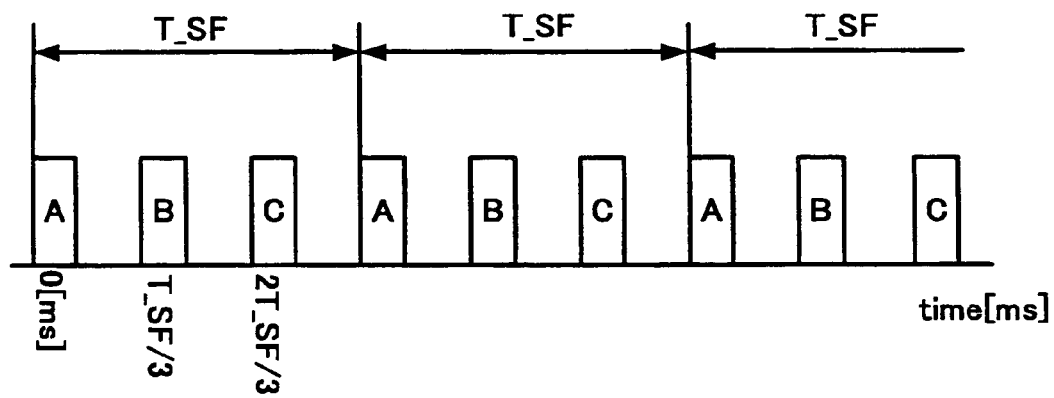
FIG. 12 is a timing chart to show the presence of three communication stations A, B and C each of which transmits the beacon at the interval of the predetermined super frame period T_SF.
Figure 13:
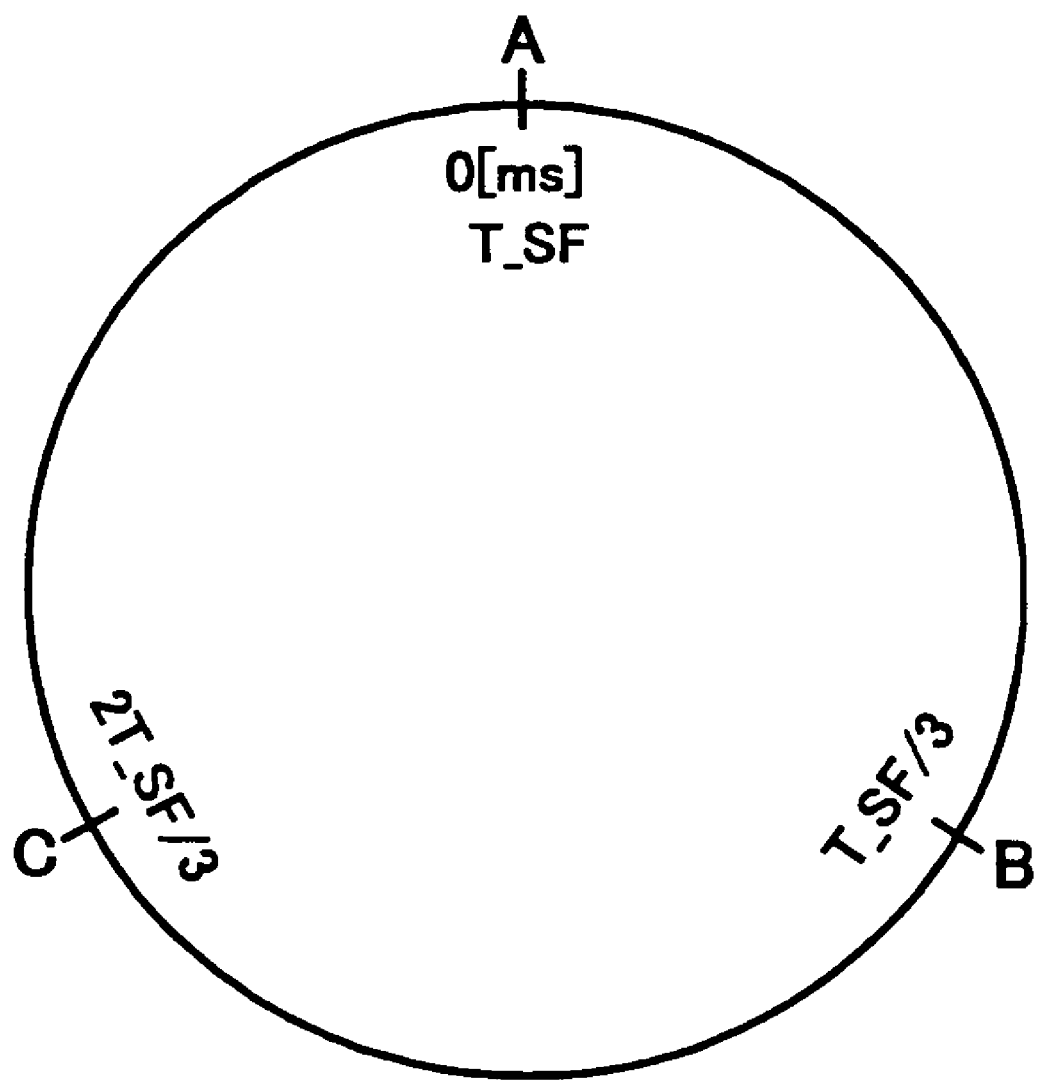
FIG. 13 is a chart to show that beacons are transmitted from the communication stations A, B and C at a constant interval.

It is assumed that there are, for example, 3 communication stations A, B and C and that each communication station transmits its own beacon at the interval of the predetermined super frame period T_SF as shown in FIG. 12. Since the beacon is transmitted at every constant period, it can be illustrated as shown in FIG. 13. When it is desired to transmit a signal to a particular communication station, in a system in which transmission is permitted only in a certain period immediately after transmission of the beacon from the receiving communication station, latency from the time when the communication station desires to transmit to the time when it can actually start to transmit is equal to approximately T_SF at maximum. Since the T_SF should be determined based on the maximum number of the stations to be accommodated in the network, it cannot cope with varying number of communication stations, thereby causing waist or time loss when the actual number of stations is small.

Accordingly, when the number of communication stations in a communication area is small, a technique is proposed in the specification to permit a communication station to transmit more than one beacons in a super frame period, thereby effectively shortening the interval between beacon signals and acquiring prioritized transmission and/or reception period immediately after transmission of each beacon and reducing latency at the start time of transmission. In other words, by shortening the interval between beacons, waiting time before starting transmission is shortened and the transmission rate is increased, thereby reducing latency.

Normally, the super frame period in a channel is defined by the interval between beacons. In the particular embodiment, second and subsequent beacons in one super frame period are transmitted for the primary purpose of acquiring the prioritized transmission/reception periods, which are different from the primary nature of the beacons transmitted for establishing the network. In the specification, second and subsequent beacons in one super frame period are referred to as "supplementary beacons".

On the other hand, the minimum beacon interval Bmin is limited so that beacons do not overflow in a bandwidth (super frame period), thereby restricting the upper limit of the number of communication stations to be accommodated in a super frame period (as described hereinabove). For this reason, when a new communication station enters a network, release of the supplementary beacons is required in order to accommodate it in the super frame period.

Now, procedures to add and release supplementary beacons in a super frame period will be described hereunder.

(1) Procedures to Add Supplementary Beacons:

Any communication station which detects a sufficient room in the interval between beacons is able to report a desire to add supplementary beacons by broadcasting. At this time, the report should include such information as the scheduled time to add and the like. When it receives consent responses from all communication stations accommodated in the same communication area within a predetermined period of time or when it receives no rejection response from any communication station within a predetermined period of time, supplementary beacons are added within the predetermined time.

Figure 14:
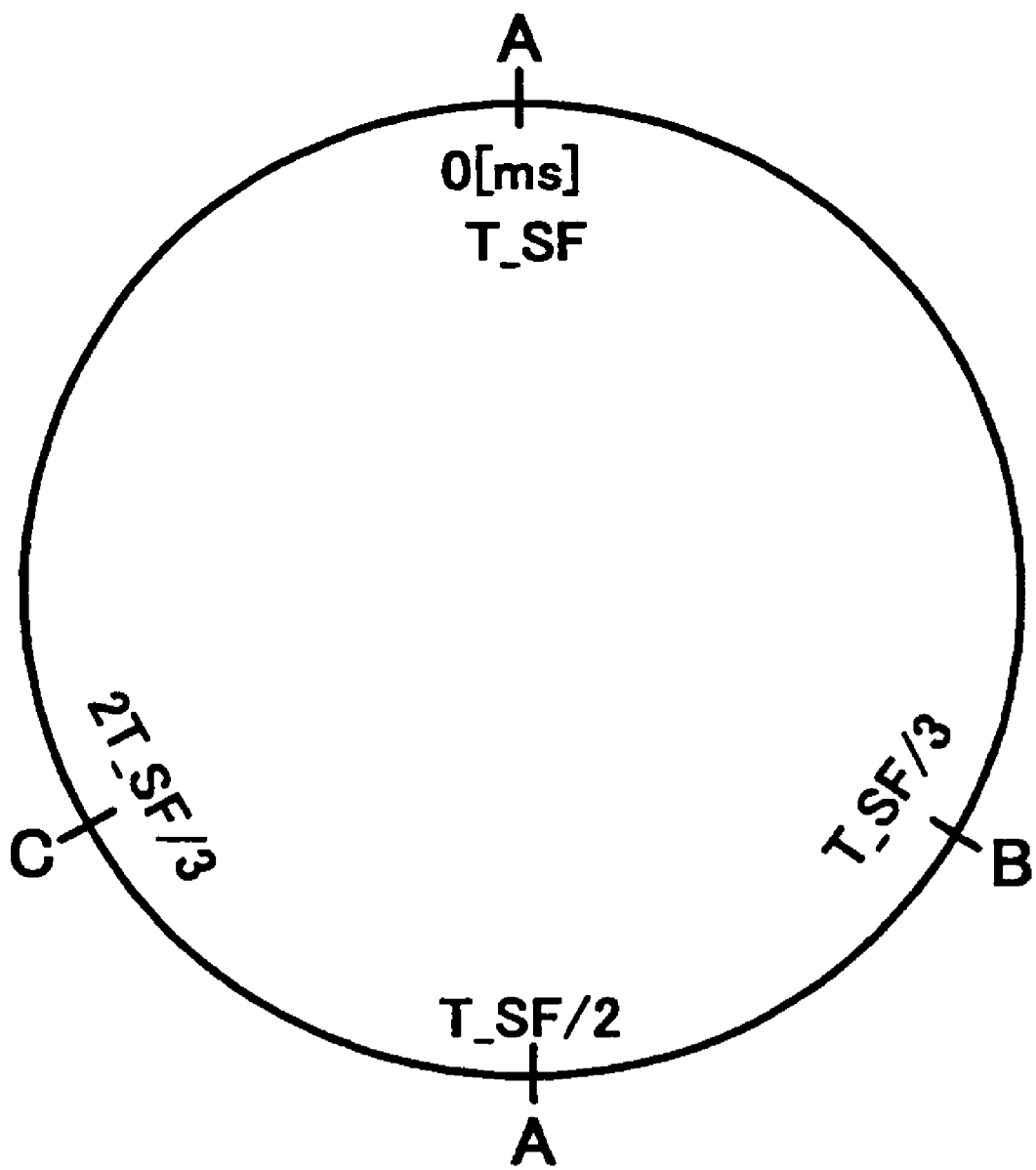
FIG. 14 is an example to show that the communication station A is transmitting a supplementary beacon in the super frame period as shown in FIG. 13.

FIG. 14 shows an example that the communication station A is transmitting a supplementary beacon in the super frame period configuration as shown in FIG. 13. In the particular example as shown in FIG. 14, in addition to transmission of the normal beacon signal at the head of the super frame period, the communication station A adds the supplementary beacon at the time T_SF/2 which is equally spaced from the beacon transmission position for the communication station B at the time T_SF/3 when one-third of the super frame period has passed from the head thereof and the beacon transmission position for the communication station C at the time 2T_SF/3 when two-thirds of the super frame period has passed from the head thereof. As a result, the communication station A is able to acquire prioritized time sections for transmission or reception at immediately after the head of the super frame period and the supplementary beacon position T_SF/2.

Figure 15:
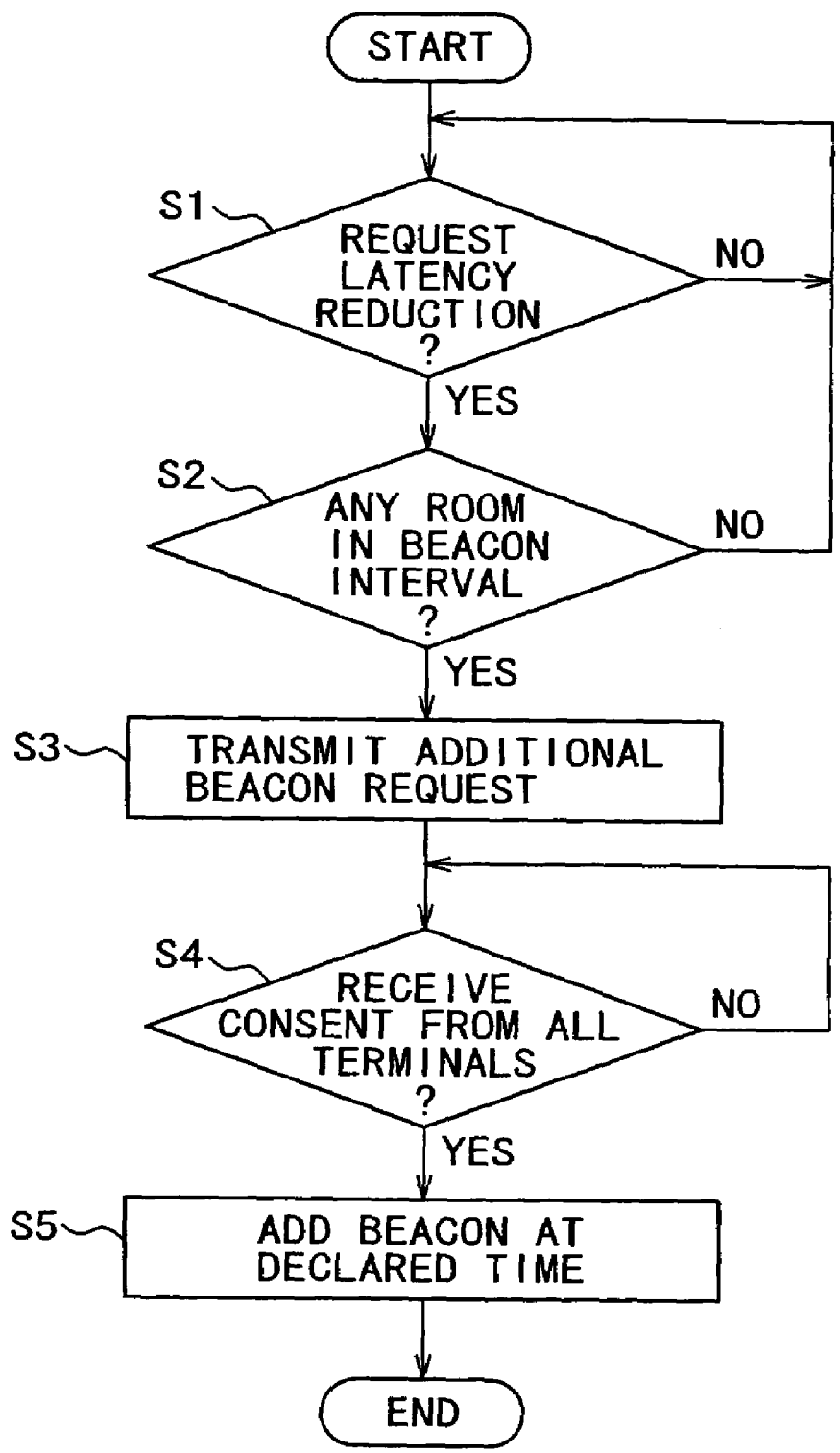
FIG. 15 is a flowchart to show operation procedures of the communication station to add a supplementary beacon.

FIG. 15 shows the operation procedures of adding the supplementary beacon in a flowchart format. In a steady state, it is assumed that there is a trigger to reduce latency for a certain communication station at step S1. The communication station firstly observes the utility condition of the wireless medium for 1 super frame period to confirm whether or not there is any room in the beacon interval at step S2.

If it is determined that there is a room in the beacon interval, a request to add a supplementary beacon is transmitted to all communication stations in the communication area at step S3. The request should include the information when the beacon will be added (scheduled time to add).

If consent responses are received within a predetermined period from all communication stations which receive the beacon at step S4 or if no rejection response is received within a predetermined time from any communication station, then the requesting communication station adds the supplementary beacon at the declared time at step S5. As a result, the communication station successfully reduces latency at the start time of transmission. In case of adding the supplementary beacon in the above procedures, there requires a mechanism for counting the time from transmission of the request to add the beacon to the time to receive the response and the time to perform the addition of the beacon.

(2) Procedures to Shorten Super Frame Period:

In the above example, reduction of latency at the start time of transmission is realized by adding the supplementary beacon within the super frame period. However, it is also possible to shorten the beacon interval by shortening the super frame period, thereby reducing latency. Latency only for the particular communication station which adds the supplementary beacon can be reduced in the former case. On the other hand, according to the latter case, all communication stations whose beacons are accommodated in the super frame period are able to equally enjoy the advantage of reducing latency.

When any communication station detects that the number of communication stations accommodated in a super frame period is small, the communication station notifies its desire to shorten the super frame period by broadcasting. The super frame period is shortened if consent responses are received from all communication stations within a predetermined period of time or it no rejection response is received from any communication station within a predetermined period of time.

On the contrary, when the number of accommodated communication stations becomes large, extension of the super frame period will be notified in order to secure sufficient time period for the prioritized transmission/reception for each communication station. By extending the super frame period, the number of beacons to be placed within the super frame period can be increased, thereby resulting in effectively releasing resources.

Figure 16:
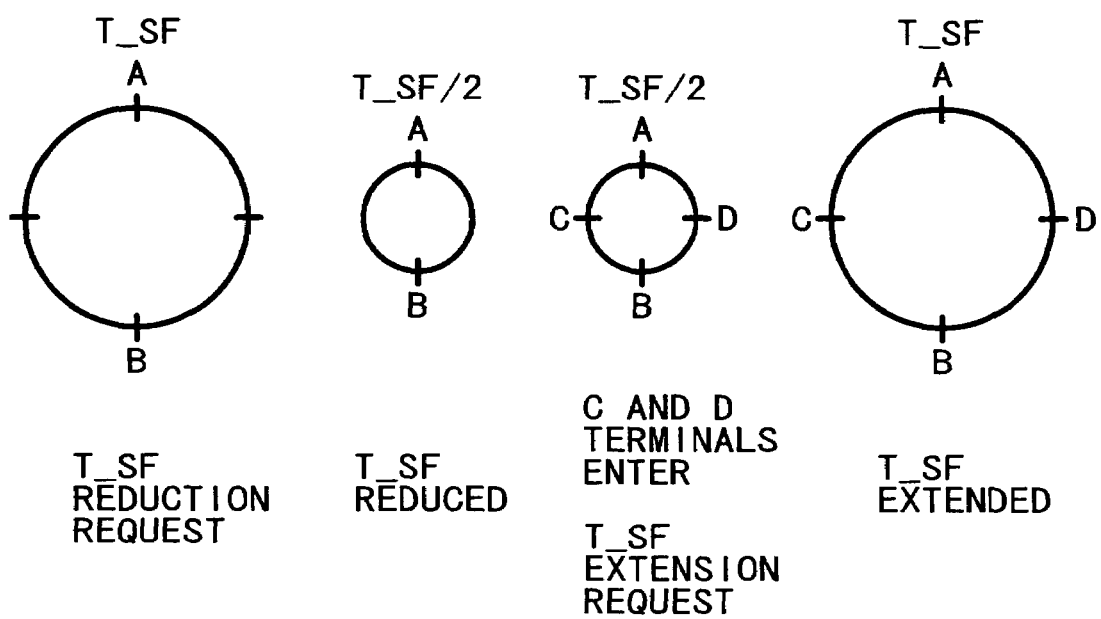
FIG. 16 is a chart to show the way how the super frame period is shortened or extended.

FIG. 16 illustrates by diagrams the ways how shortening and extension of the super frame period are carried out. In a case when only the communication station A and the communication station B are present in the super frame period, there is a sufficient room in the beacon interval and thus latency before starting transmission/reception is unreasonably large. Accordingly, the super frame period is shortened in accordance with a shortening request by, for example, the communication station A.

Thereafter, in case when other communication station C and communication station D enter the network, there is no room in the beacon interval and thus no sufficient period for prioritized transmission/reception is available after transmission of the beacon from each communication station. At this time, extension of the super frame period (or returning to the original period) is carried out in accordance with an extension request by, for example, the communication station A.

Figure 17:
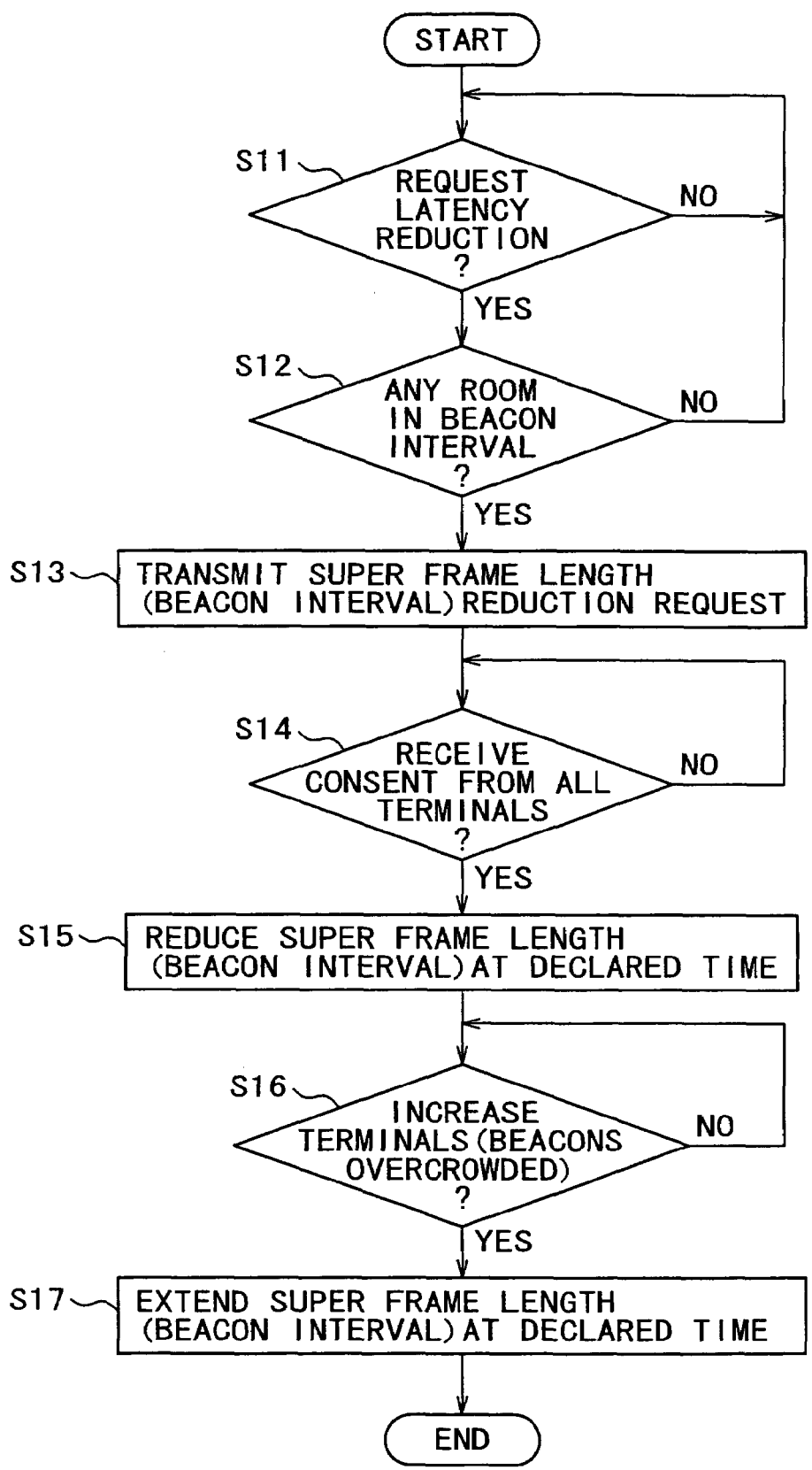
FIG. 17 is a flowchart to show operation procedures of the communication station for shortening or extending the super frame period.

FIG. 17 shows the operation procedures of a communication station for shortening and extending the super frame period in a flowchart format. In a steady state, it is assumed that there is a trigger to request for reducing latency of a certain communication station at step S11. The communication station firstly observes the utility condition of the wireless medium for 1 super frame period in order to confirm whether or not there is any room in the beacon interval at step S12.

If there is a room in the beacon interval, a request for shortening the super frame period is transmitted to all neighbor communication stations at step S13. The request should include a description when the super frame period is going to be shortened. If consent responses are received from all communication stations which receive the beacon within a predetermined period of time from transmission of the request at step S14 or if no rejection response is received from any communication station within a predetermined period of time, then the super frame period is shortened simultaneously at the declared time at step s15. As a result, the beacon transmission timing of all communication stations within the communication area is shortened, thereby equally succeeding to reduce latency of all communication stations.

Thereafter, if the number of communication stations in the communication area increases to such extent that the beacons are overcrowded at step S16, any communication station which becomes aware of such condition declares extension of the super frame and then simultaneously extend the super frame at the declared time at step S17. The procedures of extending the super frame by the communication stations follow those of shortening it.

It is to be noted that the technique for adjusting latency by shortening or extending the super frame period requires that all communication stations included in the communication area operate on the common super frame period. As a result, information regarding the length of the super frame is included in the beacon information.

(3) Non-Procedure Addition of Supplementary Beacons:

The technique for adding the supplementary beacons by a particular communication station in accordance with the procedures have been described hereinabove. If it is able to distinguish normal beacons from excess beacons, it is possible to add excess beacons by discretion of each communication station, thereby avoiding the complicated procedures.

For example, it is assumed that there are beacon signals from 3 communication stations disposed within the super frame period as shown in FIG. 13. If intervals between adjacent beacons are detected and determined to have a room, each communication station is able to start transmitting supplementary beacons at an equal interval as shown in FIG. 18.

Figure 18:
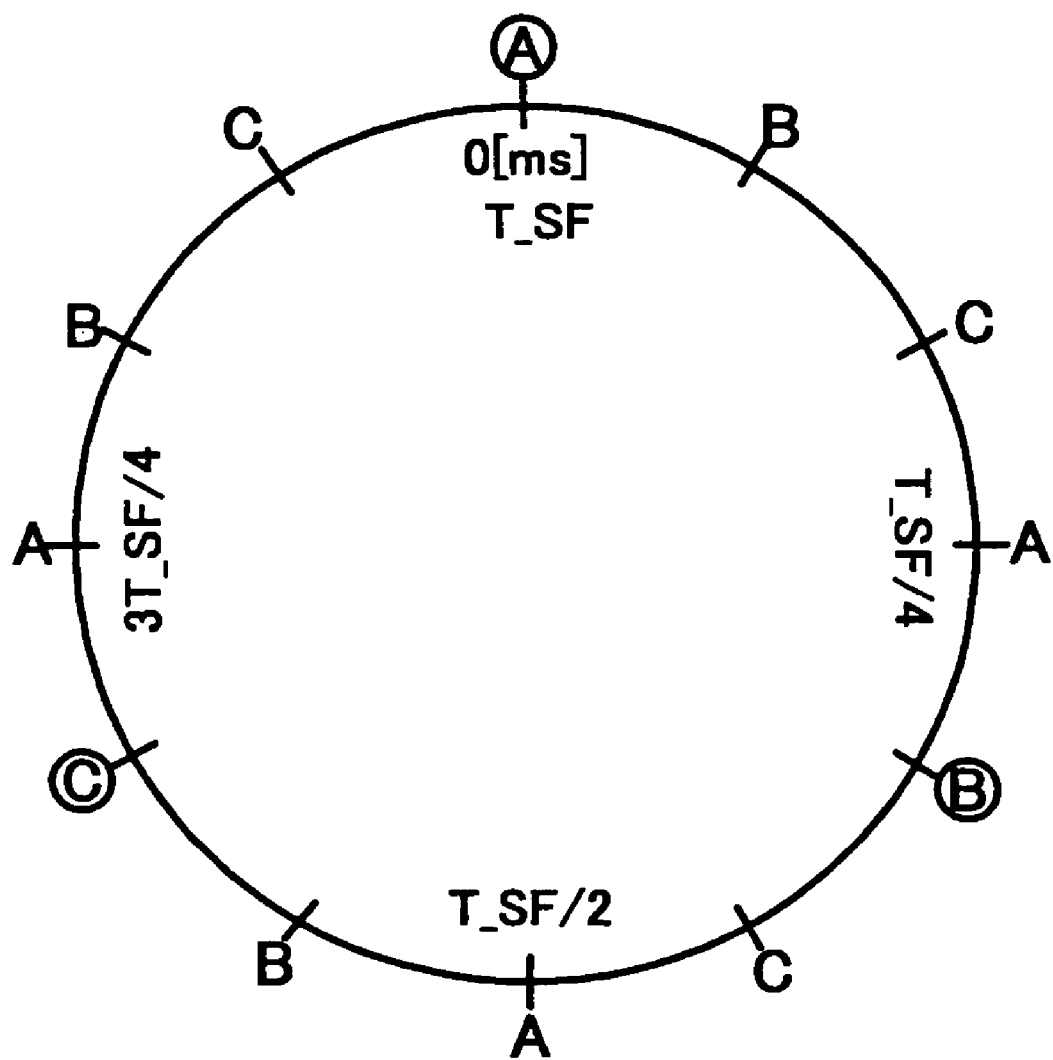
FIG. 18 is a chart to show the way of transmitting supplementary beacons at an equal interval from each communication station within the communication area.

In this example, characters in circle represent original beacons which are indicated in the beacon information in a distinguishable manner from the supplementary beacons which are indicated by characters without circle in FIG. 18. The information regarding the supplementary beacons is used to release the supplementary beacons (which will be described hereinafter) and only the supplementary beacons are released and the normal (original) beacons remain unaltered. In the example as shown in FIG. 18, it is appreciated that each communication station transmits the beacon at the interval of T_SF/4, thereby suppressing latency to ¼.

Figure 19:
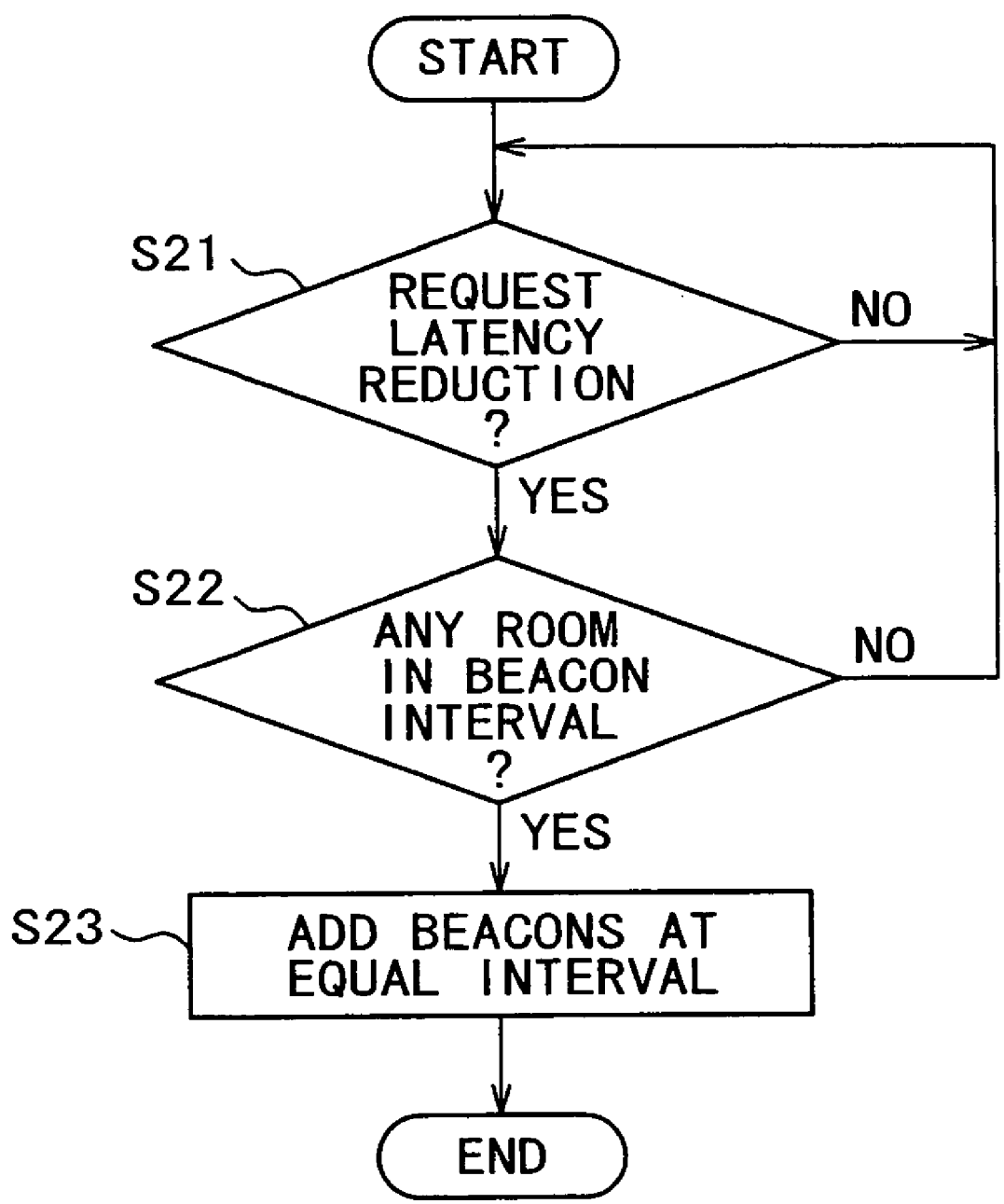
FIG. 19 is a flowchart to show processing procedures of transmitting supplementary beacons at an equal interval from each communication station within the communication area.

FIG. 19 shows the processing steps for each communication station within the communication area to transmit the supplementary beacons in a flowchart format. In the steady state, it is assumed that there is a trigger to request for reducing latency in a certain communication station at step S21. The communication station firstly observes the utility condition of the wireless medium for 1 super frame period and confirms whether or not there is a room in the beacon interval at step S22. If there is a room in the beacon interval, length of the own super frame is effectively shortened and beacons are added at an equal spacing within the super frame period, thereby succeeding to reduce latency at step S23.

With regard to the particular embodiment, it is assumed that a communication station requires several milliseconds for shifting from the POWER-OFF condition when the power is completely shut off for saving power consumption to a PLL-OFF condition when the PLL or the phase-locked loop (synthesizer) is in the off condition and that several hundreds microseconds is required for shifting from the above condition to the PLL-ON condition. Only tens of microseconds are required to shift from the PLL-ON condition to the transmission/reception condition.

Normally, by turning on the PLL, a system clock is transmitted to each layer of the communication protocol. In case of performing communication by using the supplementary beacons like the present embodiment, the communication protocol layers for generating communication data apparently require the system clock and thus the PLL must be on. When the PLL is on, there is no difference from the power consumption point of view whether or not the supplementary beacons are continuous or dispersed. Accordingly, power consumption is not different from the following embodiment in which the supplementary beacons are transmitted continuously. However, if the load of the upper layer of the communication protocol for generating packets takes into consideration, it is advantageous to dispose the supplementary beacons at a constant interval. It is to be noted that examples are shown with particular values such as PLL_ON in the specification. However, the present invention should not be restricted to such examples.

Although each communication station adds the supplementary beacon at an equal interval in the example as shown in FIG. 18, the subject matter of the present invention does not restrict to such particular arrangement and it is possible to add the supplementary beacon at any desired interval. In this case, it is also possible to adopt the non-procedure if the supplementary beacons are distinguishable from the regular beacons. As described hereinabove, although latency can be significantly reduced in this particular embodiment, the load to the upper layer for generating packets increases.

Figure 20:
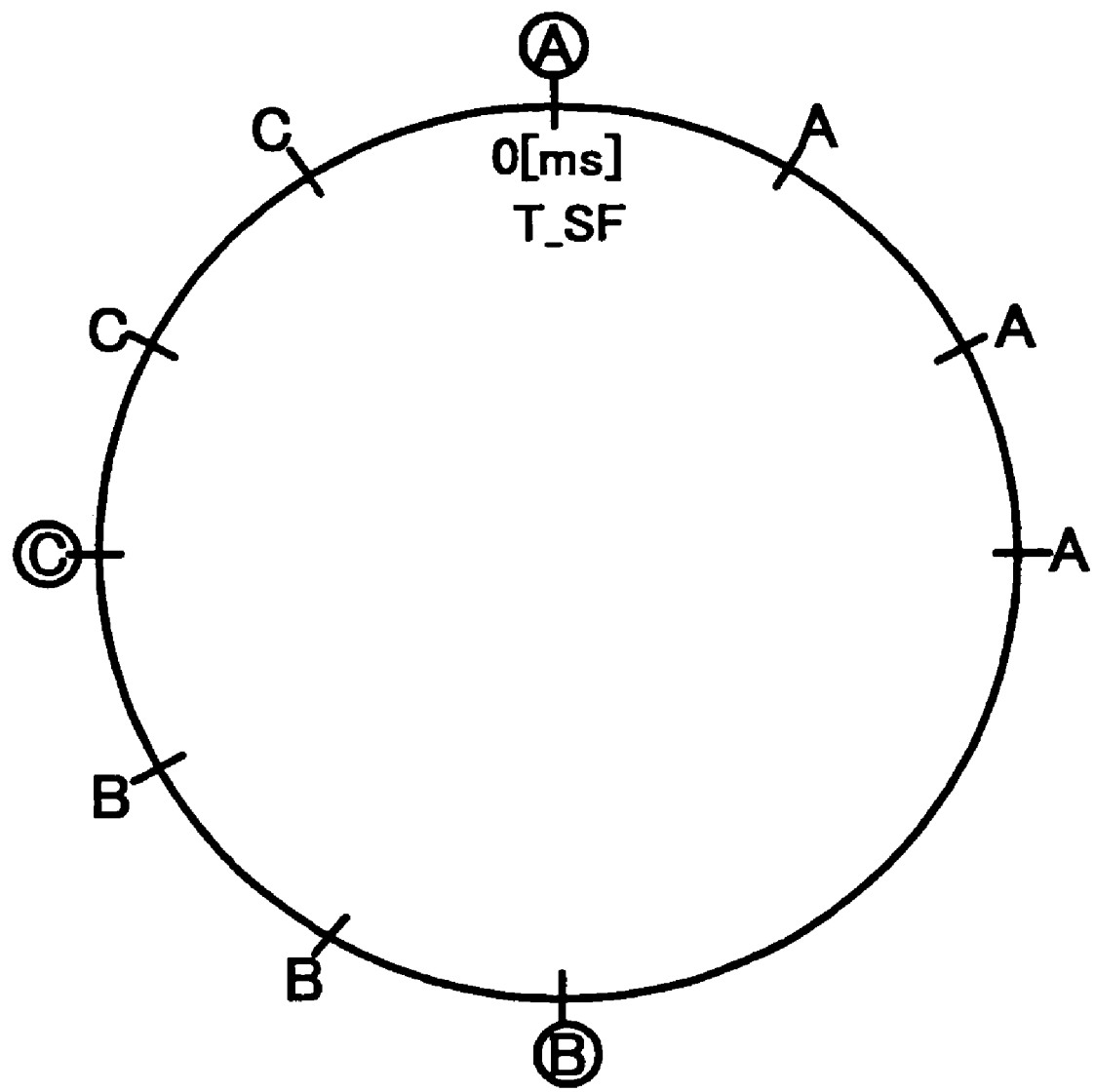
FIG. 20 is a chart to show the way of transmitting supplementary beacons at a desired interval from each communication station within the communication area.

In the case when the original or regular beacons are disposed, for example, at the positions as indicated by characters in circle as shown in FIG. 20, the supplementary beacons are transmitted at the positions as indicated by characters without circle. In this case, the beacon intervals for each communication station are constant (i.e., T_SF/12 in the example as shown in FIG. 20) but they are not transmitted continuously at the interval rather transmitted collectively in certain sections of time.

By employing the above method, each section of time when a certain communication station is transmitting its beacons is tacitly understood that the communication station has a priority right to transmit or receive, thereby effectively achieving the QoS (Quality of Service) requirements. In this manner, it is possible for, for example, an image reproduction terminal which requires larger amount of communication to transmit more supplementary beacons than other terminals, thereby realizing the function similar to wider bandwidth acquisition.

Figure 21:
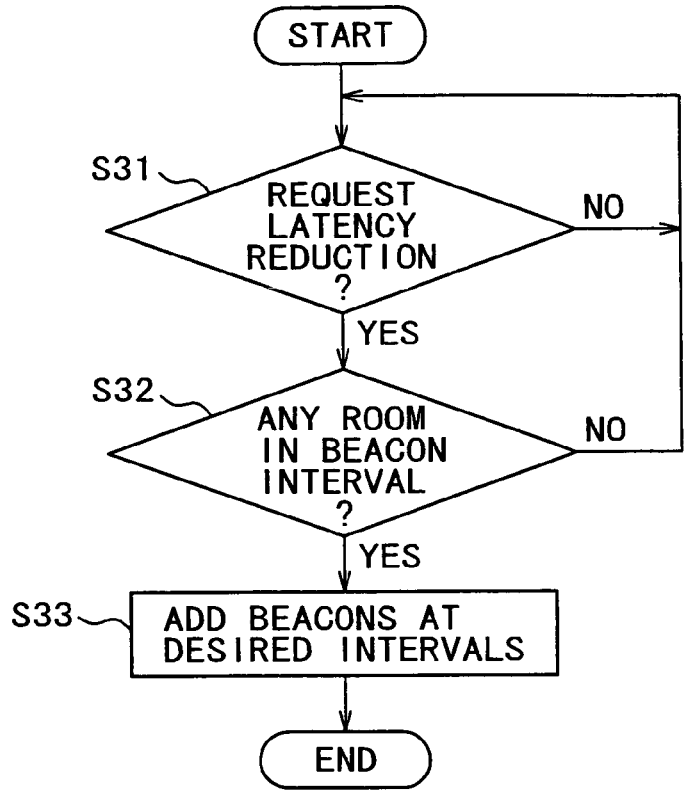
FIG. 21 is a flowchart to show processing procedures for transmitting supplementary beacons at a desired interval from each communication station within the communication area.

FIG. 21 shows procedure steps in a flowchart format, in which each communication station within a communication area is able to transmit the supplementary beacon at any desired interval. In a steady state, it is assumed that a certain communication station sends a trigger requesting for reducing latency at step S31. The communication station firstly observes the utility condition of the wireless medium for 1 super frame period in order to confirm whether or not there is a room in the beacon interval at step S32.

In case when there is a room in the beacon interval, beacons are added at a desired interval within the super frame period, thereby succeeding to reduce latency at step S33. In case of adding the supplementary beacons in the non-procedure method as shown in FIG. 18 and FIG. 20, there is a need for a mechanism to release such supplementary or redundant beacons when a new communication station enters the network. Procedures for releasing the supplementary beacons will be described hereunder.

Figure 22:
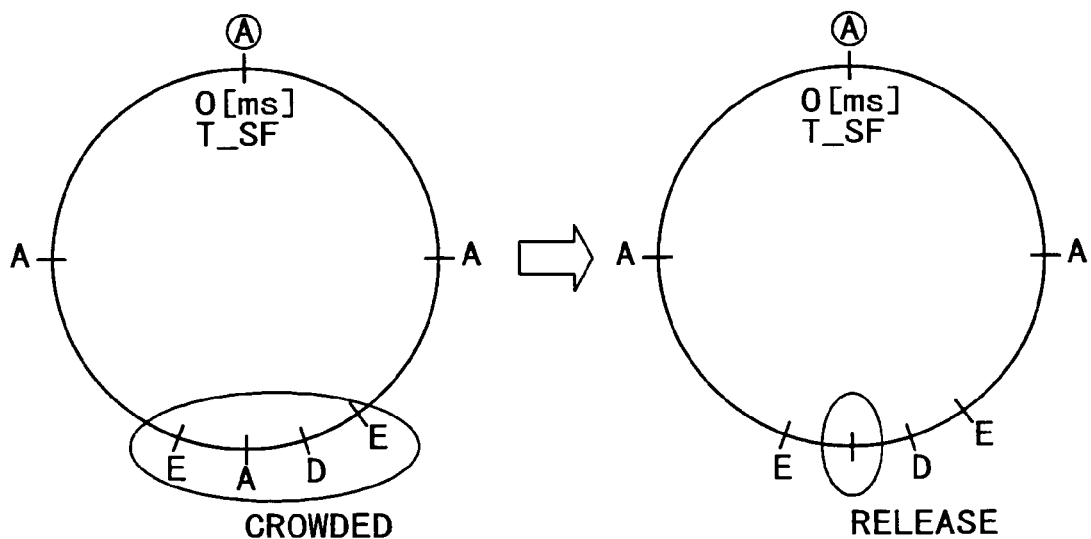
FIG. 22 is a chart to show an interval with highly crowded beacons within a super frame period.

(4) Active Releasing Procedures of Supplementary Beacons:

Any communication station transmitting many supplementary beacons performs scanning of the super frame at a short period to check the beacon transmission condition. In a case when a section of time having overcrowded beacons is detected in the super frame period as shown in FIG. 22, the supplementary beacons are released.

Figure 23:
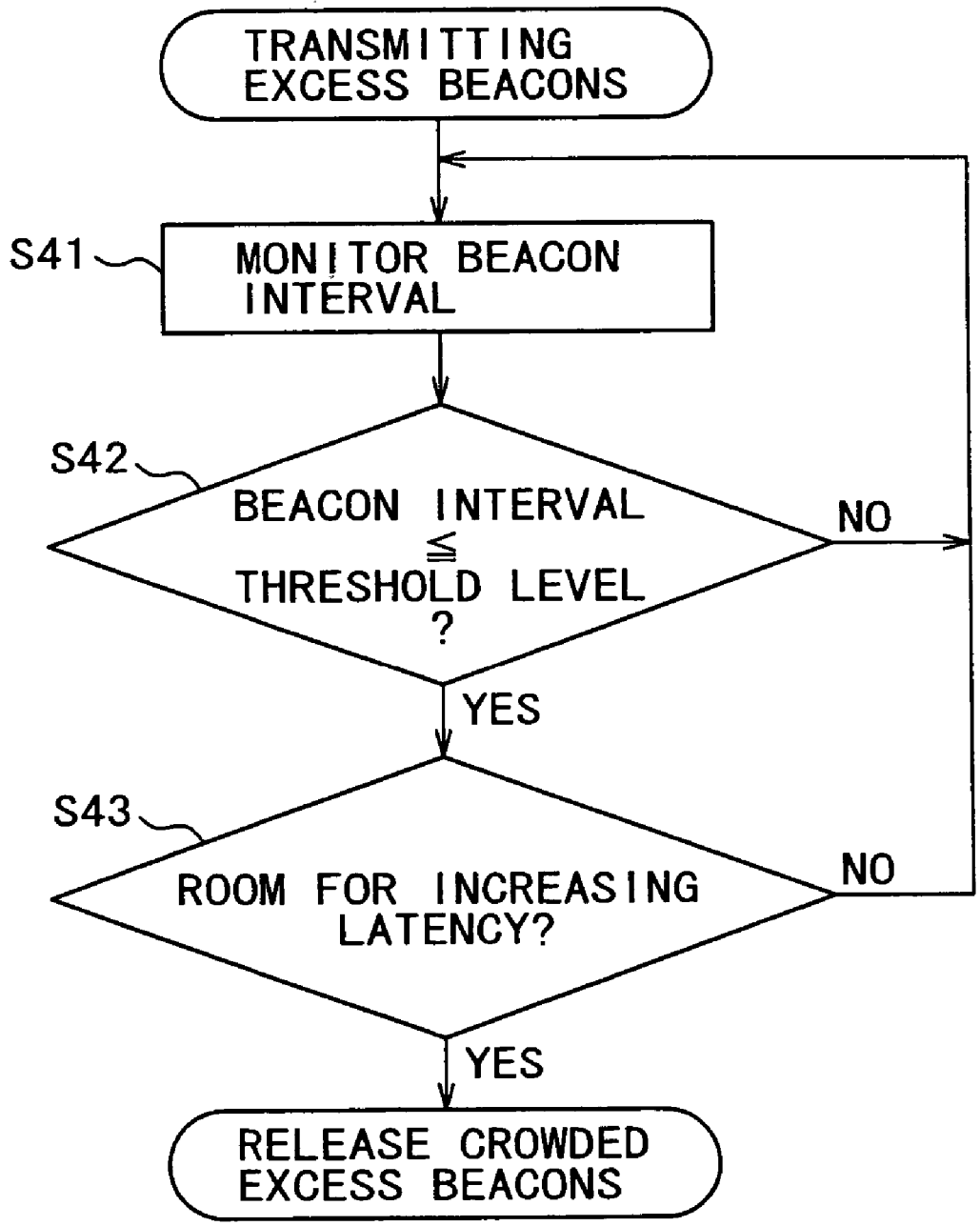
FIG. 23 is a flowchart to show processing procedures for releasing overcrowded supplementary beacons within a super frame period.

FIG. 23 shows procedure steps in a flowchart format to release excess supplementary beacons within the super frame period. Any communication station which transmits the supplementary beacon monitors the beacon interval for 1 super frame period at step S41 and checks whether or not the beacon interval is equal to or lower than the predetermined threshold level at step S42. In a case when the beacon interval is equal to or lower than the threshold level, it is checked if the communication station has a room for increasing latency at step S43. If it has a room for increasing latency, the crowded supplementary beacons are released.

Figure 24:
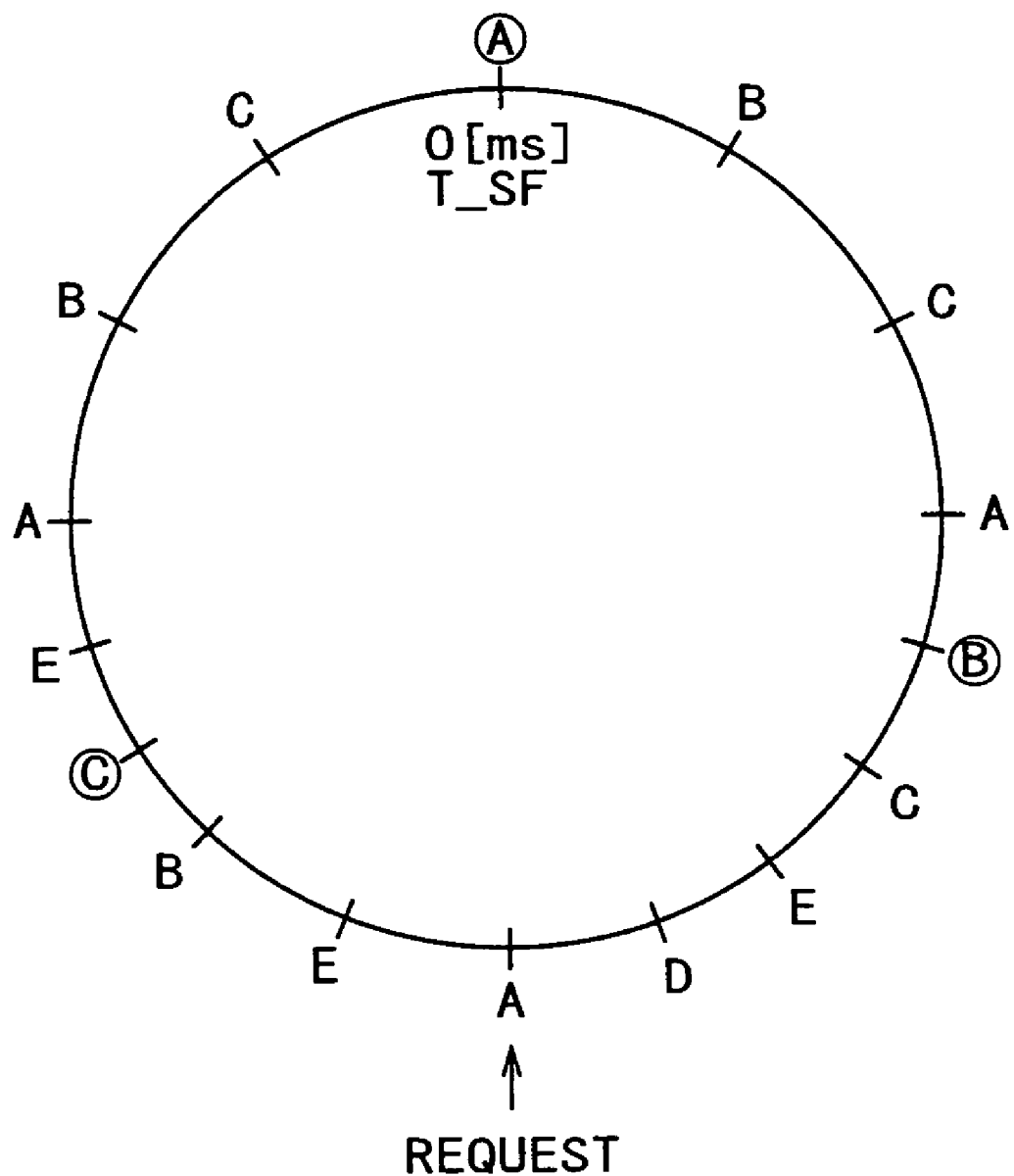
FIG. 24 is a chart to show crowded beacons over the entire super frame interval.

(5) Passive Releasing Procedure of Supplementary Beacons:

Now, it is assumed that the beacons are crowded over the entire super frame period as shown in FIG. 24. If the communication station D which is already in the network desires to transmit the supplementary beacon under the above condition. It issues a latency reduction request in a particular field in the beacon asking the other communication stations for reducing their supplementary beacons.

The other communication stations which listened to the latency reduction request release their own supplementary beacons so that the communication station D is able to position its supplementary beacon at the released section. Alternatively, if the communication station D which is already in the network desires to transmit the supplementary beacon in such circumstance when beacons are crowded over the entire super frame period as shown in FIG. 24, the communication station D may issue a latency reduction request to a specific communication station A asking for releasing the supplementary beacon at the beacon transmission position as indicated by "request" in FIG. 24.

For example, the communication station A is assumed to be one which transmits the largest number of supplementary beacons within the super frame period or has a room for increasing latency. For example, if the communication station A agrees to release the supplementary beacon in response to the latency reduction request, then the communication station D starts to transmit the supplementary beacon at the same position in place of the communication station A. There is an instance when latency reduction request is refused by the requested communication station. It is to be noted that no communication stations can request for releasing beacons at the regular beacon transmission position as indicated by characters in circle in FIG. 24.

Figure 25:
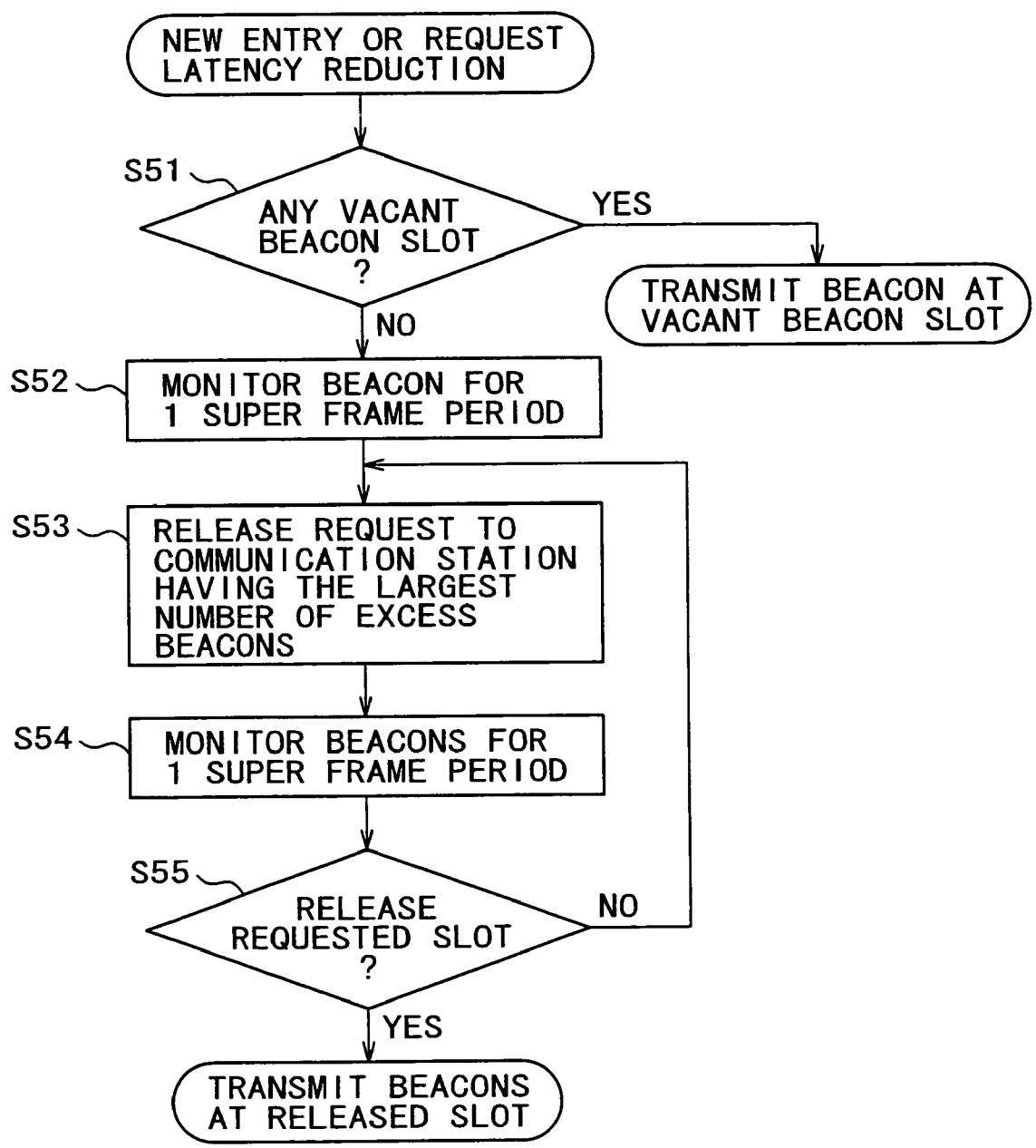
FIG. 25 is a flowchart to show processing procedures for releasing supplementary beacons in response to entrance of a new communication station or a request for reducing latency.
Figure 26:
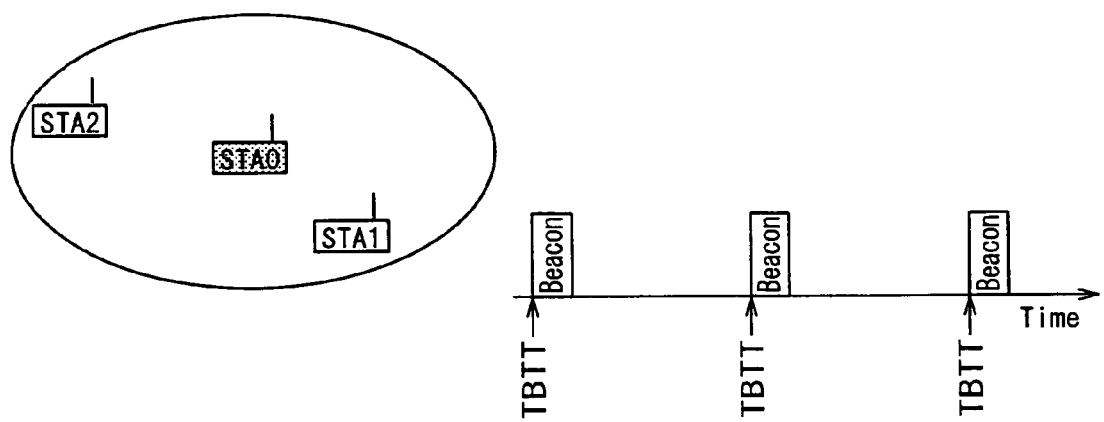
FIG. 26 is a chart to describe the wireless networking operation of the IEEE 802.11 in the infrastructure mode.
Figure 27:
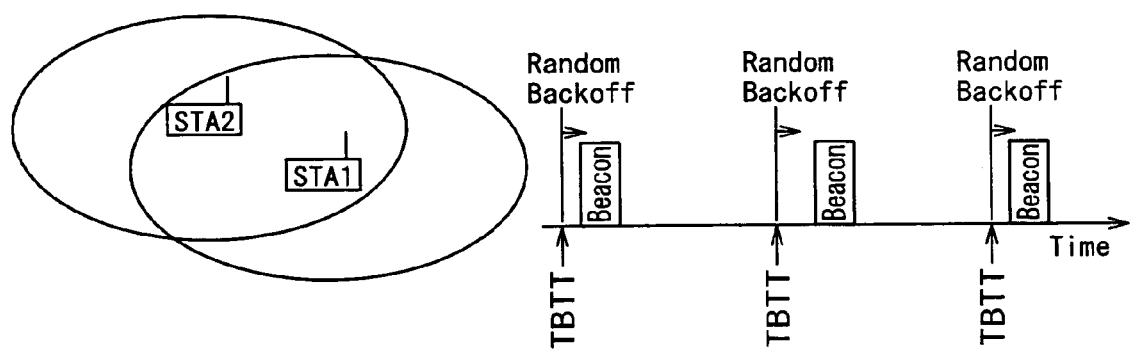
FIG. 27 is a chart to describe the wireless networking operation of the IEEE 802.11 in the ad-hoc mode.
Figure 28:
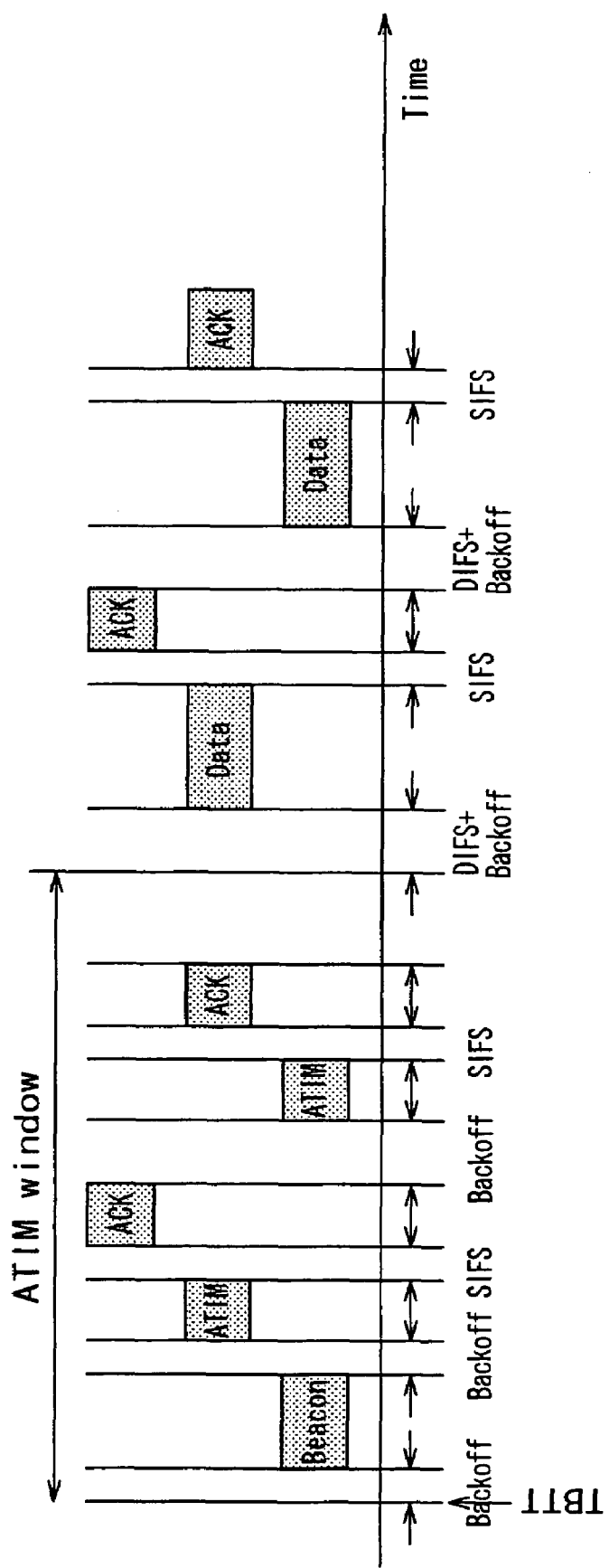
FIG. 28 is a chart to describe the wireless networking operation of the IEEE 802.11 in the ad-hoc mode.

FIG. 25 shows processing procedures in a flowchart format for releasing the supplementary beacons as a result of entering a new communication station or in response to a latency reduction request. Firstly, it is checked if there is any vacant beacon slot within the super frame period at step S51. If there is any vacant beacon slot, the beacon is transmitted using the vacant beacon slot.

On the other hand, if there is no vacant beacon slot, the beacons are monitored for 1 super frame period at step S52 in order to detect the communication station having the largest number of supplementary beacons and the request for releasing the supplementary beacons is sent to the communication station at step S53. Subsequently, beacons are monitored for 1 super frame period at step S54 in order to check if the requested beacon slot is released at step S55. Upon confirming release of the beacon slot, such beacon slot is used to start transmitting the beacon.

The present invention has been described in detail hereinabove by reference to the preferred embodiments. However, it is obvious for a person having an ordinary skill in the art that modifications and replacements of such embodiments may be made without departing from the scope and spirit of the present invention. That is, the above embodiments are disclosed for the purpose of examples of the present invention and the descriptions in the specification should not be interpreted for restricting the present invention. The subject matter of the present invention should be interpreted by reference to the appended claims.

What is claimed is:

1. A wireless communication system, comprising:
a wireless network based on an ad-hoc communication; and
a plurality of wireless communication apparatuses,
wherein each of the plurality of wireless communication apparatuses are configured to transmit a beacon by determining a beacon transmission position within a predetermined frame period,
each of the plurality of wireless communication apparatuses are configured to acquire a prioritized transmission/reception period immediately after transmitting the beacon, and
one of the plurality of wireless communication apparatuses is configured to transmit a request to the plurality of wireless communication apparatuses that a supplementary beacon be added at a specific location in the predetermined frame period, and adds the supplementary beacon only after receiving feedback from each of the plurality of wireless communication apparatuses to which the request was transmitted.

2. A wireless communication apparatus for operating under a wireless network environment without any specified control station, comprising:
communication means for receiving/transmitting wireless data;
control means for controlling receiving/transmitting operation of the wireless data by said communication means;
beacon transmitting means for transmitting beacon within a predetermined frame period; and
beacon transmitting position control means for transmitting a request, to a plurality of other wireless communication apparatuses participating in the wireless network environment, that a supplementary beacon be added at a specific location in the predetermined frame period, and adding the supplementary beacon only after receiving feedback from each of the a plurality of other wireless communication apparatuses participating in the wireless network environment to which the request was transmitted.

3. The wireless communication apparatus as cited in claim 2, wherein:
said beacon transmitting position control means shortens a beacon interval in a pseudo form by transmitting the supplementary beacon in addition to said regular beacon within the predetermined frame period.

4. The wireless communication apparatus as cited in claim 3, wherein:
said supplementary beacon is transmitted in one of a continuous form and a dispersed form.

5. The wireless communication apparatus as cited in claim 2, wherein:
said beacon transmitting position control means shortens a beacon interval by shortening the predetermined frame period.

6. The wireless communication apparatus as cited in claim 2, wherein:
said beacon transmitting position control means extends a beacon interval in response to one of a shortage of beacon interval and a lowering of request for reducing latency by an entering of a new wireless communication apparatus into the wireless network.

7. The wireless communication apparatus as cited in claim 6, wherein:
said beacon transmitting position control means extends the beacon interval by releasing a transmitting position of the supplementary beacon.

8. The wireless communication apparatus as cited in claim 7, wherein:
said beacon transmitting position control means releases the transmitting position of the supplementary beacon in response to a request for releasing the supplementary beacon from at least one of the plurality of other wireless communication apparatuses participating in the wireless network.

9. The wireless communication apparatus as cited in claim 2, wherein:
said beacon transmitting position control means requests a release of the supplementary beacon to at least one of the plurality of other wireless communication apparatuses participating in the wireless network when either a new communication station is entered into the network or a reduction of latency is necessary.

10. The wireless communication apparatus as cited in claim 6, wherein:
said beacon transmitting position control means extends the beacon interval by extending the frame period.

11. The wireless communication apparatus as cited in claim 10, wherein:
said beacon transmitting position control means extends the beacon interval by extending the frame period in response to a request for extending the frame period from at least one of the plurality of other wireless communication apparatuses participating in the wireless network.

12. The wireless communication apparatus as cited in claim 2, wherein:
said beacon transmitting position control means requests an extension of the predetermined frame period to at least one of the plurality of other wireless communication apparatuses participating in the wireless network when either a new wireless communication apparatus is entered into the network or the reduction of latency is necessary.

13. A wireless communication method for carrying out communicating operating under a wireless network environment without any specified control station, comprising the steps of:
beacon transmission step for transmitting beacon within a predetermined frame period; and
beacon transmitting position control step for transmitting a request, to a plurality of communication stations participating in the wireless network environment, that a supplementary beacon be added at a specific location in the predetermined frame period, and adding the supplementary beacon only after receiving feedback from each of the plurality of communication stations to which the request was transmitted.

14. The wireless communication method as cited in claim 13, wherein the beacon transmitting control step further comprises:
shortening the beacon interval in a pseudo form by transmitting the supplementary beacon in addition to said regular beacon within the predetermined frame period.

15. The wireless communication method as cited in claim 14, wherein:
said supplementary beacon is transmitted in one of a continuous form and a dispersed form.

16. The wireless communication method as cited in claim 13, wherein the beacon transmitting control step further comprises:
shortening a beacon interval by shortening the predetermined frame period.

17. The wireless communication method as cited in claim 13, wherein the beacon transmitting control step further comprises:
extending a beacon interval in response to one of a shortage of beacon interval and a lowering of request for reducing latency by an entering of a new communication station into the wireless network.

18. The wireless communication method as cited in claim 17, wherein the beacon transmitting position control step further comprises:
extending a beacon interval by releasing the transmitting position of the supplementary beacon.

19. The wireless communication method as cited in claim 18, wherein the beacon transmitting position control step further comprises:
releasing the transmitting position of the supplementary beacon in response to a request for releasing the supplementary beacon from one of the plurality of communication stations participating in the wireless network environment.

20. The wireless communication method as cited in claim 13, wherein the beacon transmitting position control step further comprises:
requesting a release of the supplementary beacon to one of the plurality of communication stations participating in the wireless network environment when either a new communication station is entered into the network or the reduction of latency is necessary.

21. The wireless communication method as cited in claim 17, wherein the beacon transmitting position control step further comprises:
extending the beacon interval by extending the predetermined frame period.

22. The wireless communication method as cited in claim 21, wherein the beacon transmitting position control step further comprises:
extending the beacon interval by extending the predetermined frame period in response to a request for extending the frame period from one of the plurality of communication stations participating in the wireless network environment.

23. The wireless communication method as cited in claim 13, wherein the beacon transmitting position control step further comprises:
transmitting a request for an extension of the predetermined frame period to the plurality of communication stations participating in the wireless network environment when either a new communication station is entered into the network or the reduction of latency is necessary.

24. A computer program described in a computer readable form to execute a set of processing for carrying out communicating operating under a wireless network environment without any specified control station, said set of processing comprising the steps of:
beacon transmission step for transmitting beacon within a predetermined frame period; and
beacon transmitting position control step for transmitting a request, to a plurality of communication stations participating in the wireless network environment, that a supplementary beacon be added at a specific location in the predetermined frame period, and adding the supplementary beacon only after receiving feedback from each of the plurality of communication stations to which the request was transmitted.

25. A wireless communication apparatus for operating under a wireless network environment without any specified control station, comprising:
an interface configured to receive/transmit wireless data;
a processor configured to control the receive/transmit operation of the wireless data by the interface;
an interface configured to transmit a beacon within a predetermined frame period; and
a controller configured to transmit a request, to a plurality of other wireless communication apparatuses participating in the wireless network environment, that a supplementary beacon be added at a specific location in the predetermined frame period, and configured to add the supplementary beacon only after receiving feedback from each of the a plurality of other wireless communication apparatuses participating in the wireless network environment to which the request was transmitted.

* * * * *